Feb. 16, 1971   W. CASTEDELLO ET AL   3,563,644
SOUND SLIDE PROJECTOR SYSTEM

Filed May 12, 1969   12 Sheets-Sheet 2

INVENTORS
WILLIAM CASTEDELLO
RAY L. MARQUIS

BY Hane and Baxley
ATTORNEYS

Feb. 16, 1971  W. CASTEDELLO ET AL  3,563,644
SOUND SLIDE PROJECTOR SYSTEM
Filed May 12, 1969  12 Sheets-Sheet 1

INVENTORS
WILLIAM CASTEDELLO
RAY L. MARQUIS,
BY Henne and Barley
ATTORNEYS

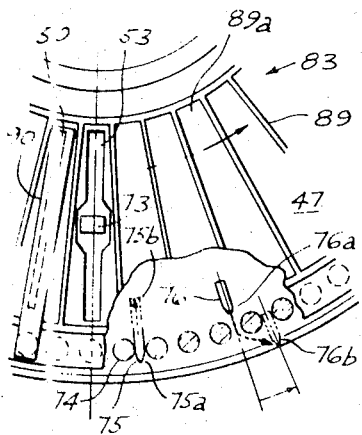

FIG. 4C

| STEP | DESCRIPTION | LIFT/LOWER ARM | | TRAY LOCK | | ROTATING BAR | |
|---|---|---|---|---|---|---|---|
| | | 73a | 73b | 75a | 75b | 76a | 76b |
| A' | CARTRIDGE #1 OPERATING | x | | x | | x | |
| B' | SLIDE #1 RAISED | | x | x | | x | |
| C' | TRAY TURNS THRU FIRST HALF-SPACE | | x | | x | x | |
| | | | x | | x | | x |
| D' | TRAY LOCKS; ROTATING BAR RETURNS | | x | x | | | x |
| | | | x | x | | x | |
| A" | ARM LOWERED | x | | x | | x | |
| B" | ARM RAISED | | x | x | | x | |
| C" | TRAY TURNS THRU SECOND HALF-SPACE | | x | | x | x | |
| | | x | | | x | | x |
| D" | CARTRIDGE #2 IN OPERATING POSITION | | x | x | | | x |
| | | | x | x | | x | |
| A''' | SLIDE #2 LOWERED | x | | x | | x | |

FIG. 4D

INVENTORS
WILLIAM CASTEDELLO
RAY L. MARQUIS
BY Hane and Baxley
ATTORNEYS

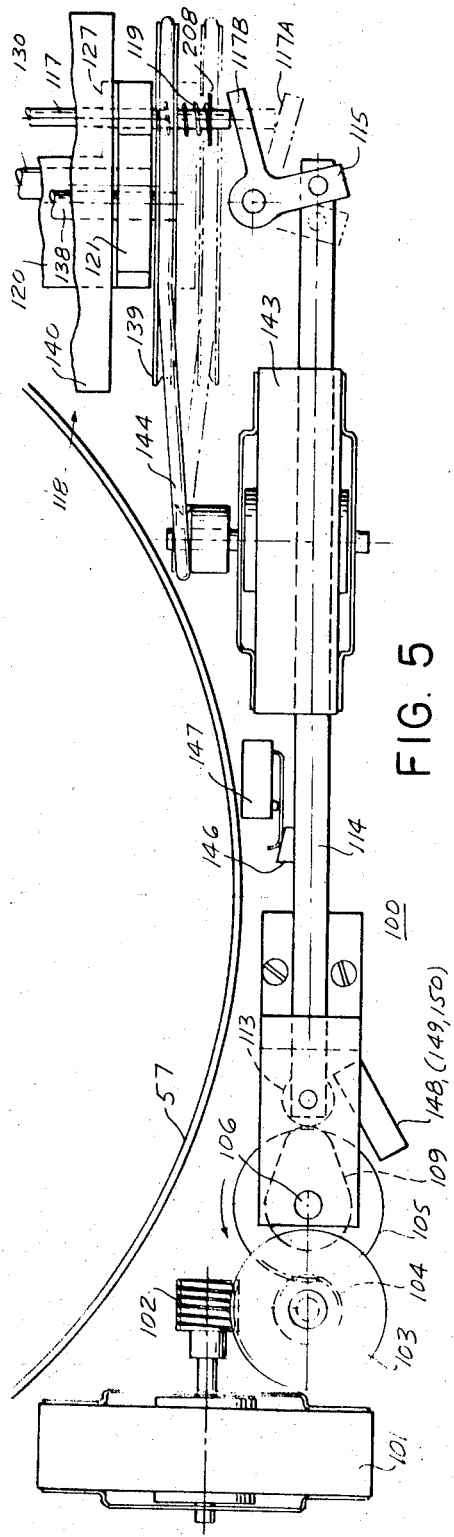
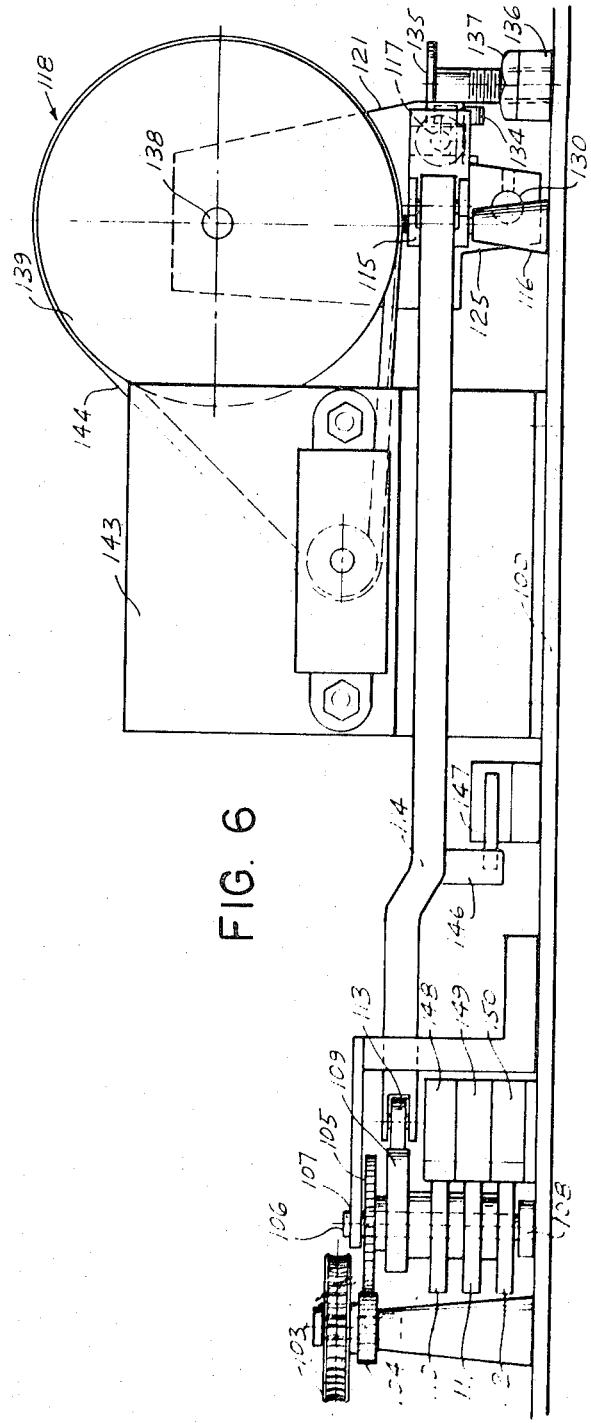

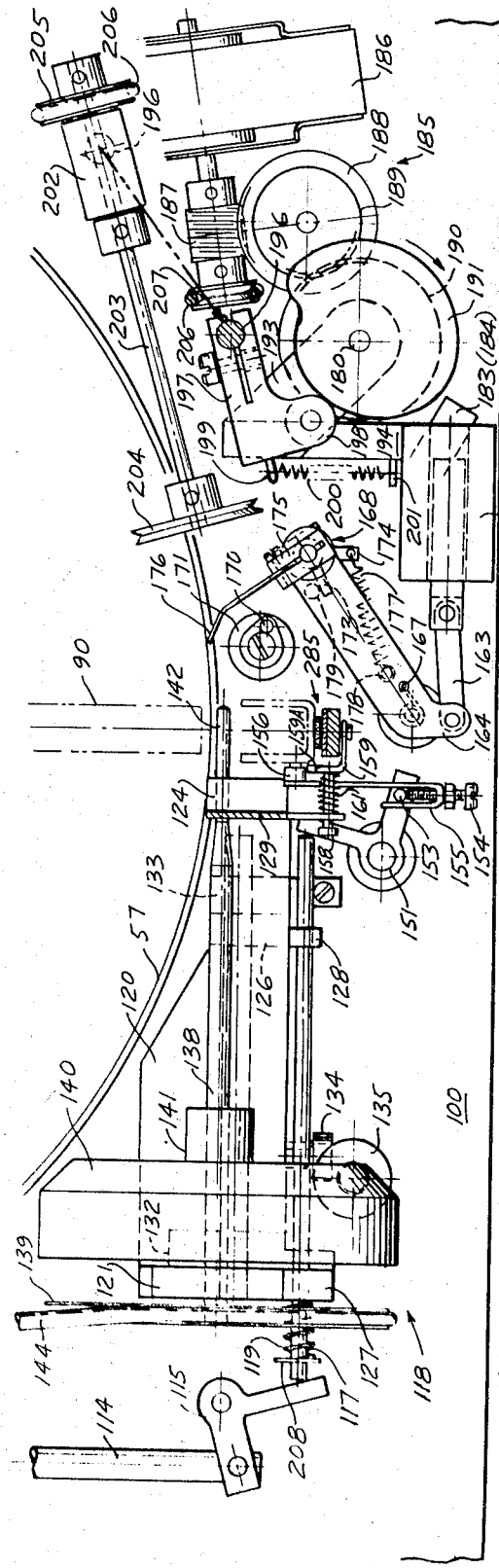
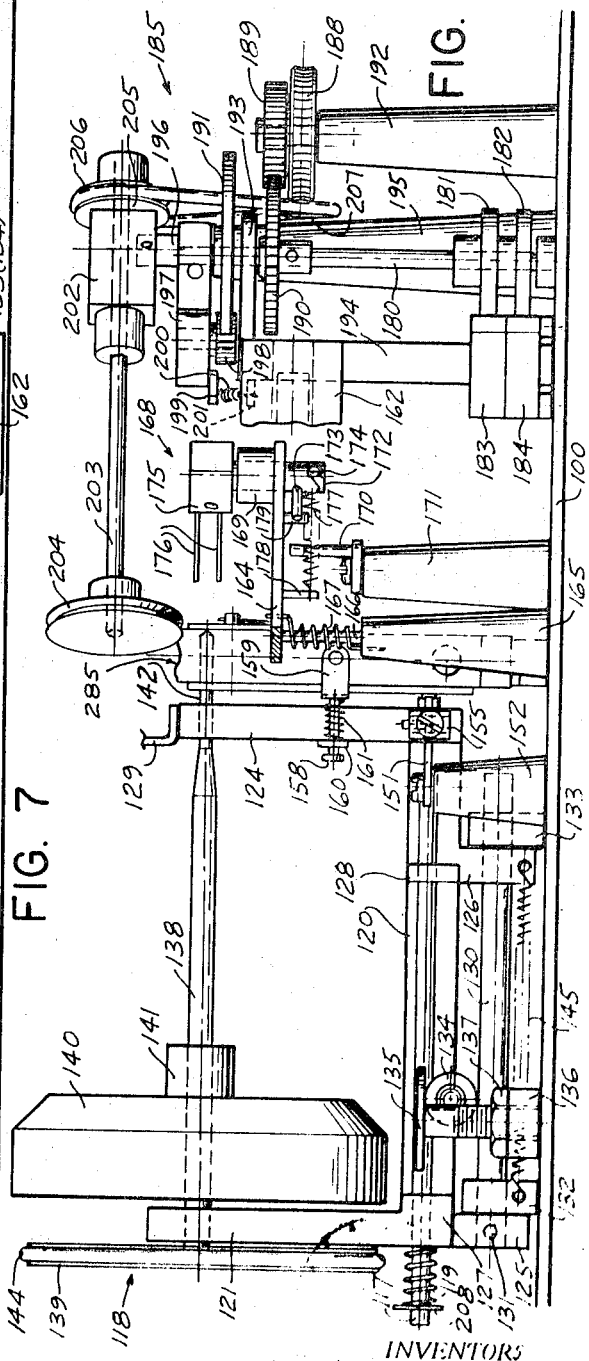
FIG. 7
FIG. 8
INVENTORS
WILLIAM CASTEDELLO
RAY L. MARQUIS
BY Hane and Baxley
ATTORNEYS

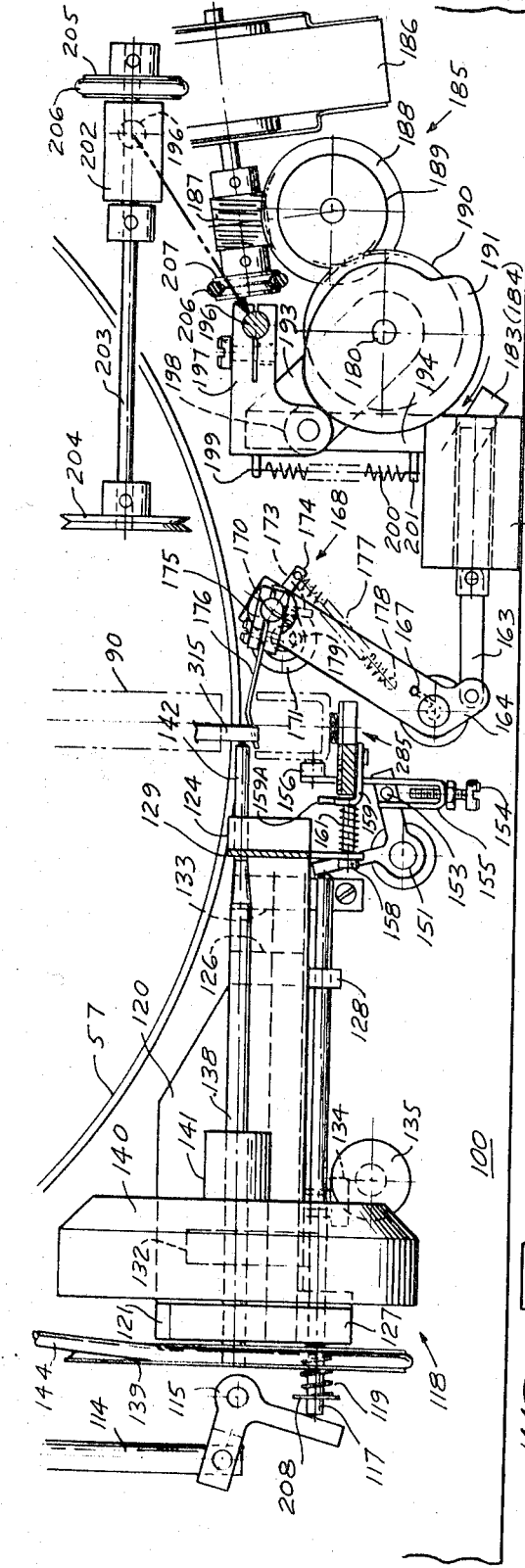
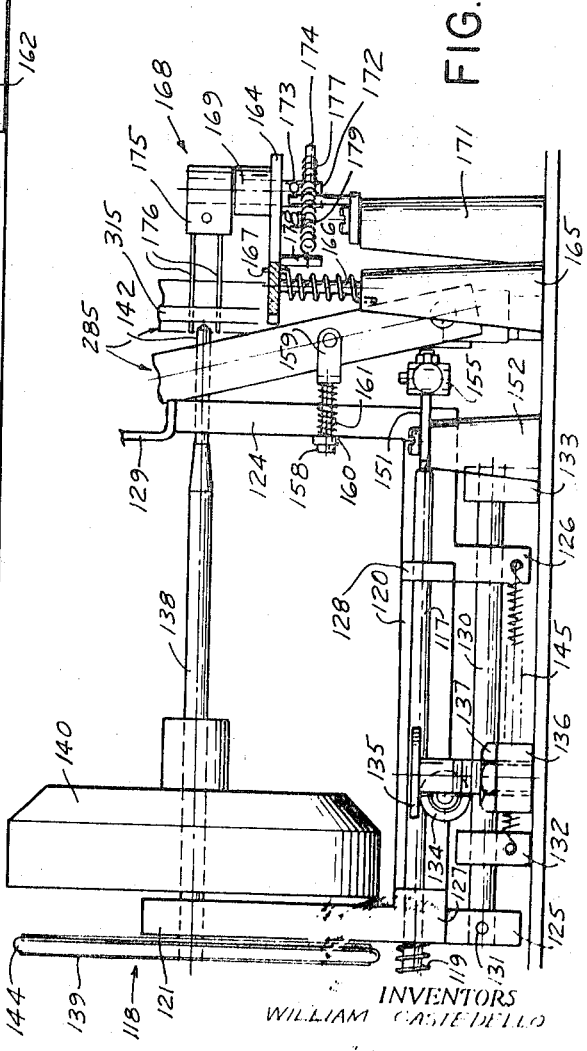

Feb. 16, 1971  W. CASTEDELLO ET AL  3,563,644
SOUND SLIDE PROJECTOR SYSTEM

Filed May 12, 1969  12 Sheets-Sheet 7

INVENTORS
WILLIAM CASTEDELLO
RAY L. MARQUIS
BY Hame and Baxley
ATTORNEYS

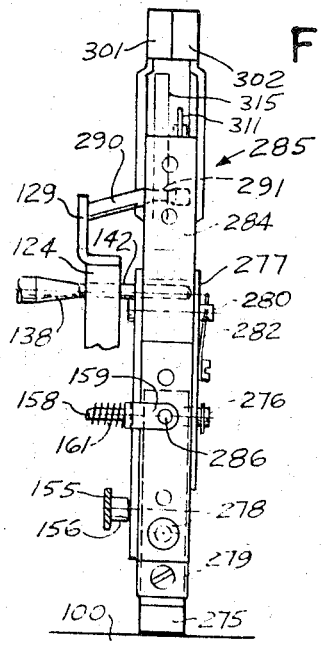
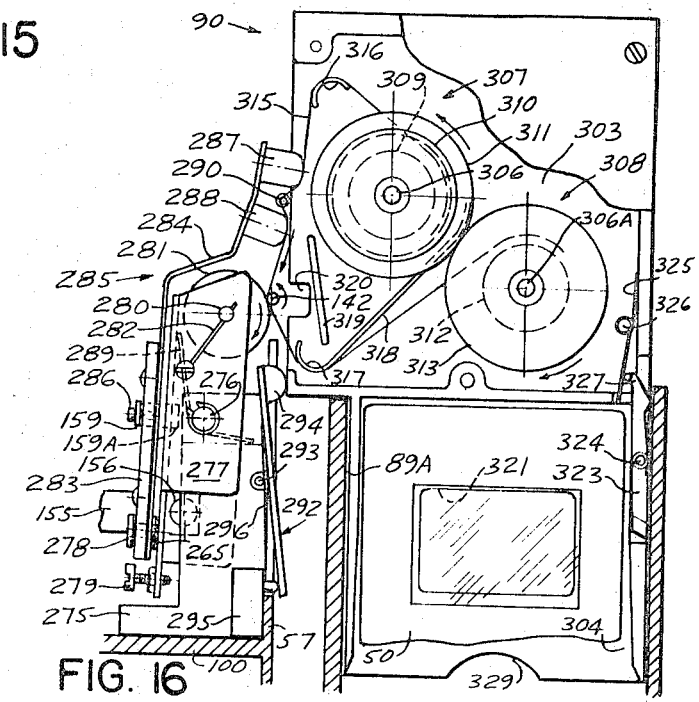
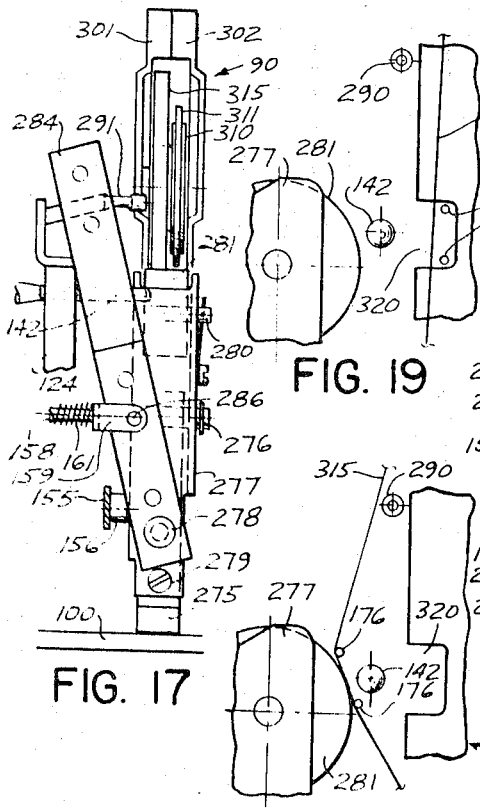
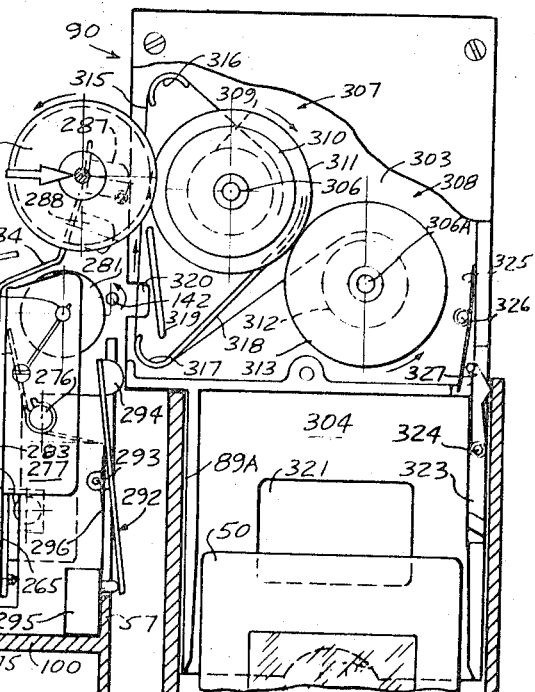

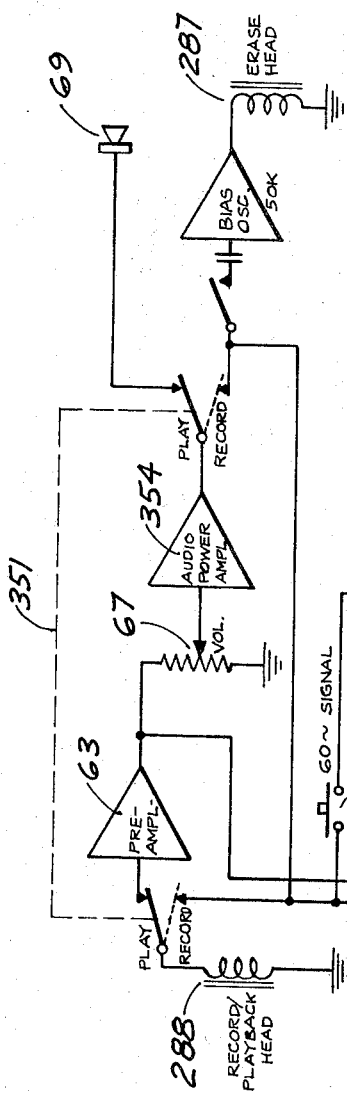
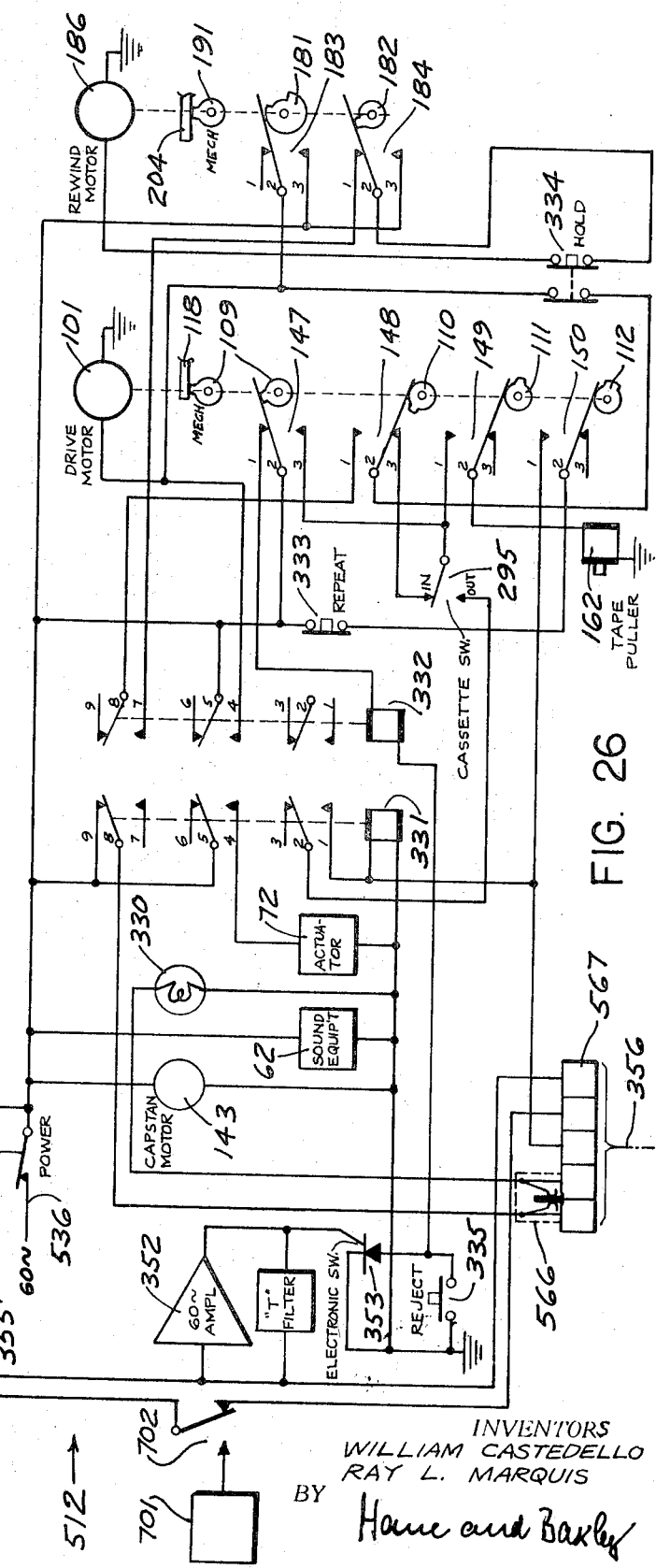
INVENTORS
WILLIAM CASTEDELLO
RAY L. MARQUIS
BY
Hane and Baxley
ATTORNEYS

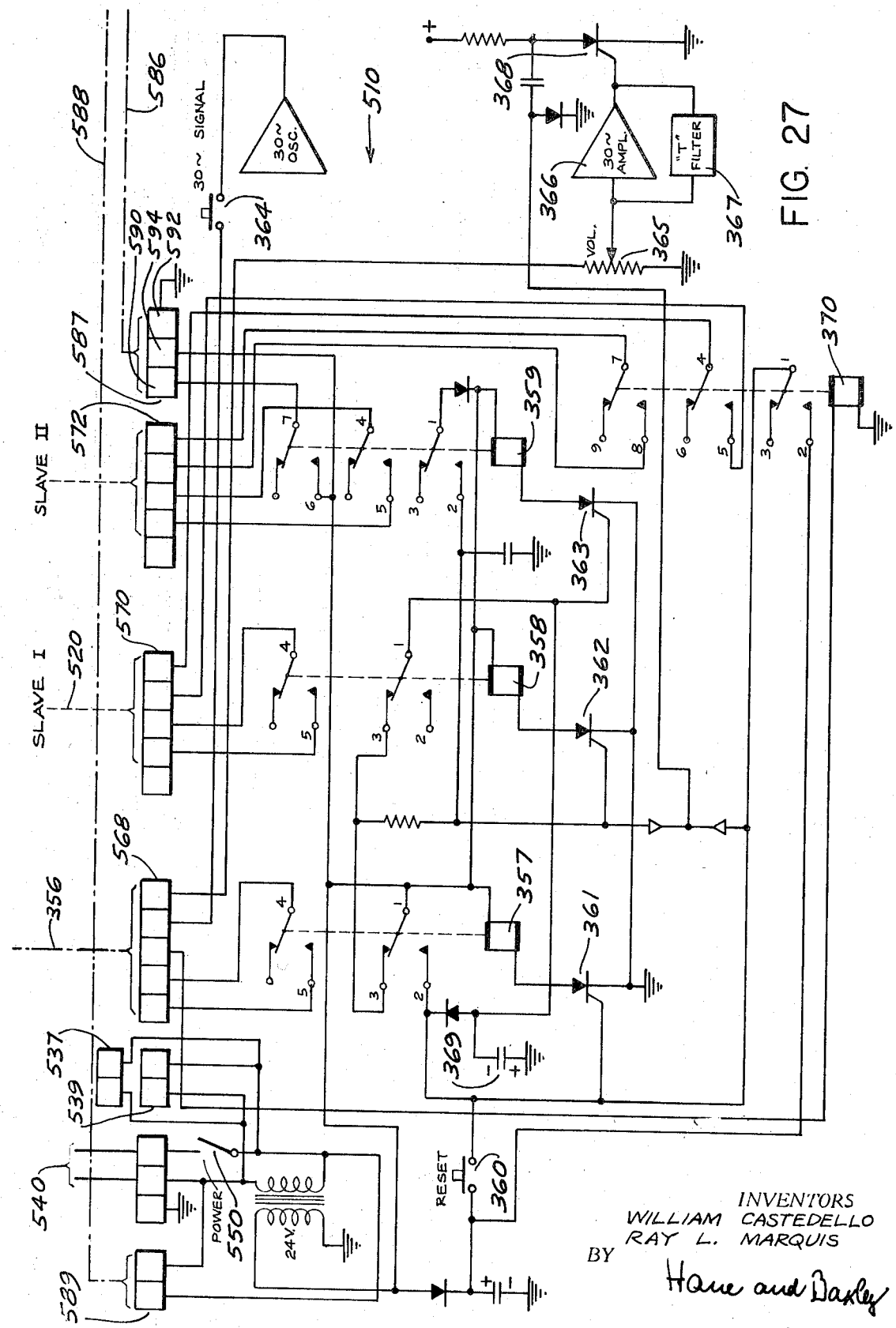

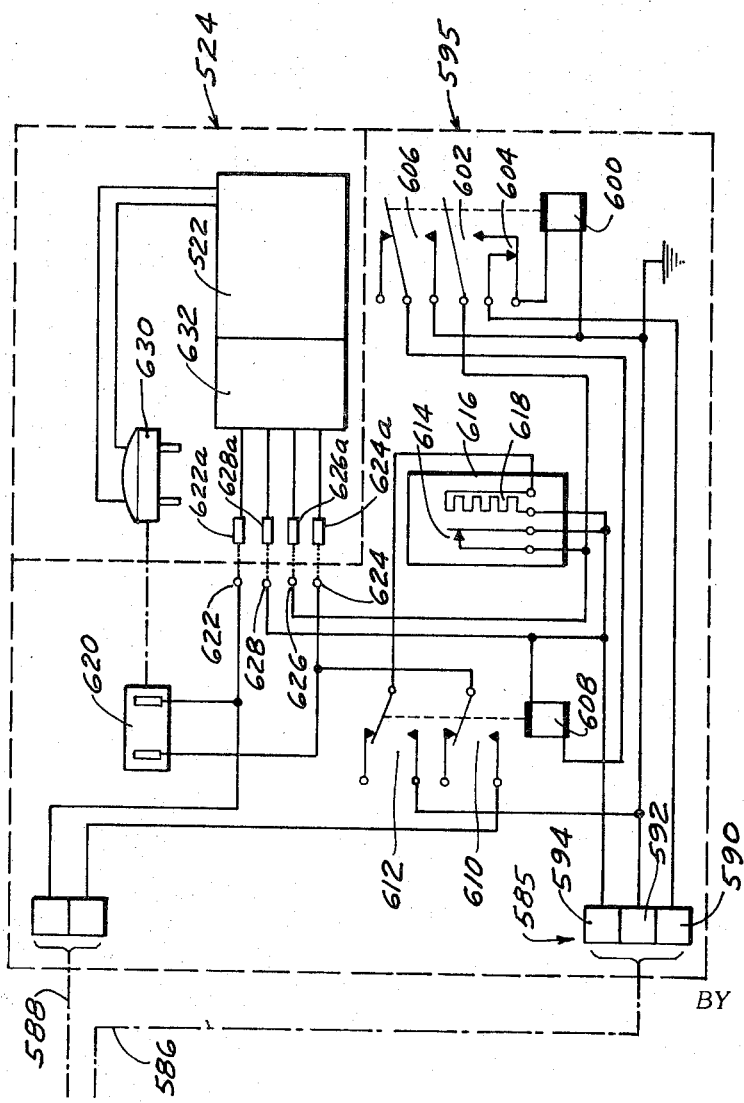

United States Patent Office 3,563,644
Patented Feb. 16, 1971

3,563,644
SOUND SLIDE PROJECTOR SYSTEM
William Castedello, Southington, and Ray L. Marquis, Brookfield, Conn., assignors to The Kalart Company Inc., Plainville, Conn., a corporation of New York
Filed May 12, 1969, Ser. No. 823,812
Int. Cl. G03b 31/06
U.S. Cl. 353—19       26 Claims

ABSTRACT OF THE DISCLOSURE

A sound slide projector system for projecting still pictures, particularly slides, and playing back sound recorded on magnetic tape or recording sound on such tape including a projector comprising a tray for accommodating a plurality of cassettes each including magnetic tape from which sound is to be played back or on which sound is to be recorded and a compartment for releasably retaining a slide to be projected. The tray has a plurality of compartments open at the bottom and each accommodating one of the cassettes and is movable with reference to a platform including a discharge slot. Stepwise movement of the tray brings successive cassettes into registry with the discharge slot to permit dropping of the respective slide into a presentation position. Each slide is returned from the presentation position into the respective cassette upon completion of a presentation. The sound projector further has an optical system for projecting a slide in the presentation position and a sound system for reproducing sound from the tape of the respective cassatte or recording sound on such tape. A common drive mechanism including a play-back capstan pulls the tape in a cassette in the presentation position past the sound head of the projector and a common rewind mechanism including a rewind capstan rewinds the tape upon completion of a play-back or recording. A cycling mechanism electronically controlled by means of a signal of selected frequency recorded on the tape operates tray moving means, the sound system, the optical system and slide returning means in a predetermined sequence and time relationship. The cycling mechanism may also be utilized to control one or more slave projectors.

CROSS REFERENCE

Copending applications Ser. No. 757,023. filed September 3, 1968; 739,293, filed June 24, 1968.

SPECIFICATION

The present invention relates to a projector for projecting a sequence of still pictures and audible reproducing or recording sound each associated with one still picture. More particularly, the invention relates to a sound slide projector for projecting still pictures in the form of framed photographic transparencies, commonly referred to as slides, and playing back sound recorded on magnetic tape both supported in a cassette, or recording sound on such tape.

BACKGROUND

There are known sound slide projectors which comprise a projecting unit and a sound unit structurally and physically separated from each other. The sound to be audibly reproduced with projectors of this kind may be magnetically recorded on a suitable carrier such as tape, wire, a disc coated with magnetic material, or a disc bearing a spirally grooved sound track. The two units may be and are frequently functionally coupled in that upon completion of a playback of the recording a signal is transmitted by the sound unit to the projecting unit causing the latter to advance a new slide into position for projection.

Apparatus of this kind have the disadvantage that they must be carefully set up for each presentation of slides and physically separated associated sound record carriers and that they require considerable space and synchronization of their separate functions. The slides and the sound record carriers must be synchronized so that each slide is functionally associated with the correct sound record carrier which is time consuming. Moreover, practical experience shows that confusion between the slides and the associated sound record is not infrequent, or that the sound record carrier belonging to a specific slide is lost.

Automatic slide projectors in which slides in a magazine are successively fed to a projection gate, either in timed sequence or upon demand from an operator are well known. Among such projectors is known a projector including a rotary circular magazine in which each slide is held in a narrow, radially oriented slot from which it is fed by gravity to a projection gate and is returned to its slot by a lifting arm at the end of the projection period. The magazine is then rotated to the next slot and the process is repeated. Projectors of this type are known by the trademark Carousel.

Cassettes are also well known in which a picture or a slide to be projected is provided with a sound reproduction means in the form of fixed or movable sound tracks, or in the form of a strip of magnetic tape. In cassettes of this kind one portion of the cassette casing receives the slide to be projected and a second portion includes a cavity in which a length of magnetic sound recording tape is retained in a manner which permits it to cooperate with a capstan and pickup head in the projector and thereby to reproduce a sound message lasting for approximately 30 seconds or longer. A projector in which the necessary elements have been arranged to perform the aforepointed out functions is described in copending application Ser. No. 589,643 filed Oct. 26, 1966. In a projector according to this application, a self-contained adapter fits over the Carousel projector or similar projector and functions to project slides successively placed in the projection position and to reproduce the accompanying sound, utilizing the projection lens, lamp and condenser system as well as the lamp switch and other elements of the Carousel projector.

Although this arrangement is satisfactory for most purposes there are certain applications, such as in teaching and in some types of briefing, where it is desirable to present to the audience more than one pictorial message during the period of the auditory message. For example, it may be of value to show a second or third slide depicting a situation related to that in the first slide, or one which follows chronologically, or a short sequence of motion pictures which portrays some dynamic aspect or detail of the narrative material.

THE INVENTION

It is an object of the invention to provide a novel and improved sound slide projector system in which a projecting assembly and a sound reproducing assembly are structurally and functionally combined.

It is also an object of the invention to provide a novel and improved sound slide projector which is ready for projection and audible reproduction or recording of sound without requiring setting up of the projection assembly and of the sound assembly for each presentation, requires less space than conventional apparatus having physically separated projection and sound assemblies, and eliminates all danger of wrongly combining slides and sound records, or losing either a slide or a sound record constituting in combination a presentation of picture and sound.

Another object of the invention is to provide a novel and improved sound slide projector which is capable of automatically presenting a succession of slides each accompanied by associated playback of sound.

Still another object of the invention is to provide a novel and improved sound slide projector which accepts a plurality of cassettes each containing a slide and a record carrier in the form of magnetic tape or wire and which automatically triggers an advance from cassette upon completion of a presentation of picture and sound.

A further object of the invention is to provide a novel and improved sound slide projector which includes as part of the apparatus convenient and simple repeat control means for repeating the presentation of the slide and the associated sound record in selected cassettes.

It is also an object of the invention to provide a sound slide projector according to the invention with equipment for recording sound on the sound record carrier contained in the afore-referred to cassettes.

A further object of the invention is to provide a novel and improved sound slide projector in which rewind of the tape or wire is effected by a rewind mechanism common to all cassettes accommodated in the projector.

Still another object of the invention is to provide a novel and improved sound slide projector in which the slide of a cassette in the presentation position is removed from the cassette to a projection position and returned into the cassette upon completion of the presentation and in which the tape in the cassette after being played back or recorded upon is rewound by the common rewind mechanism, return of the slide and rewind of the tape being controlled by electronically operated means responsive to a frequency signal recorded on the tape.

Still another object of the invention is to provide a novel and improved cassette including a first compartment for releasably retaining a slide therein and a second compartment including a magnetic tape support and suitable for use in a sound slide projector according to the invention.

It is also an object of the invention to provide a novel and improved sound slide projector system which accepts a plurality of cassettes of the general kind hereinbefore referred to and which, in addition, automatically controls one or more further operations, for instance, projection of silent slides and projection of motion picture film by means of slave projectors in such a way that the sound slide projector and the further projectors function in the manner of a "master and slave team."

A more specific object of this invention is to provide a control system for sharing projection time between a master slide-and-sound projector and one or more slave projectors.

It is also a specific object of the invention to provide a control system for sharing at least part of an audible message played back from a record carrier contained within cartridges in the master projector with one or several silent still picture or motion picture slave projectors.

Still another object of the invention is to provide a control system which can vary the amount of time shared among the projectors.

A further object of the invention is to utilize either still or motion picture projectors as desired.

A still further object of the invention is to utilize as slave projectors existing available devices with a minimum of modification.

Other and further objects, features and advantages of the invention will be pointed out hereinafter and set forth in the appended claims constituting part of the application.

In the accompanying drawings, preferred embodiments of projector systems according to the invention are shown by way of illustration and not by way of limitation.

In the drawings:

FIG. 4C is a fragmentary plan view of FIG. 1;

FIG. 4D is a schedule of the slide insertion and tray transport cycle;

FIG. 5 is a plan view of the assembly for positioning and driving the capstan of the sound assembly of the projector and of part of the assembly for positioning the sound head or heads of the projector;

FIG. 6 is an elevational view of FIG. 5;

FIG. 7 is a plan view of the assembly disposed to the right of FIG. 5;

FIG. 8 is an elevational view of FIG. 7;

FIG. 9 is a view of the assembly of FIG. 7 in an alternate position of operation;

FIG. 10 is a view of the assembly of FIG. 8 in an alternate position of operation;

FIG. 15 is a front elevation of part of the mechanism of the projector and of the cassette;

FIG. 16 is a side elevational view of FIG. 15, partially broken;

FIG. 17 is a view of FIG. 15 in an alternate position of operation;

FIG. 18 is a view of FIG. 16 in an alternate position of operation;

FIG. 19 is a partial elevational view of the capstan assembly;

FIG. 20 is a view of FIG. 19 in an alternate position of operation;

FIG. 26 is a schematic view of the electronically controlled cycling system of the projector;

FIG. 27 shows schematically the circuit system of the multi-projector control box;

FIG. 28 is a schematic diagram showing the circuitry in a photoelectric adaptor box used with the control box for motion picture projector adaption; and FIG. 29 is a placement diagram for FIGS. 26, 27 and 28.

Figure 2:
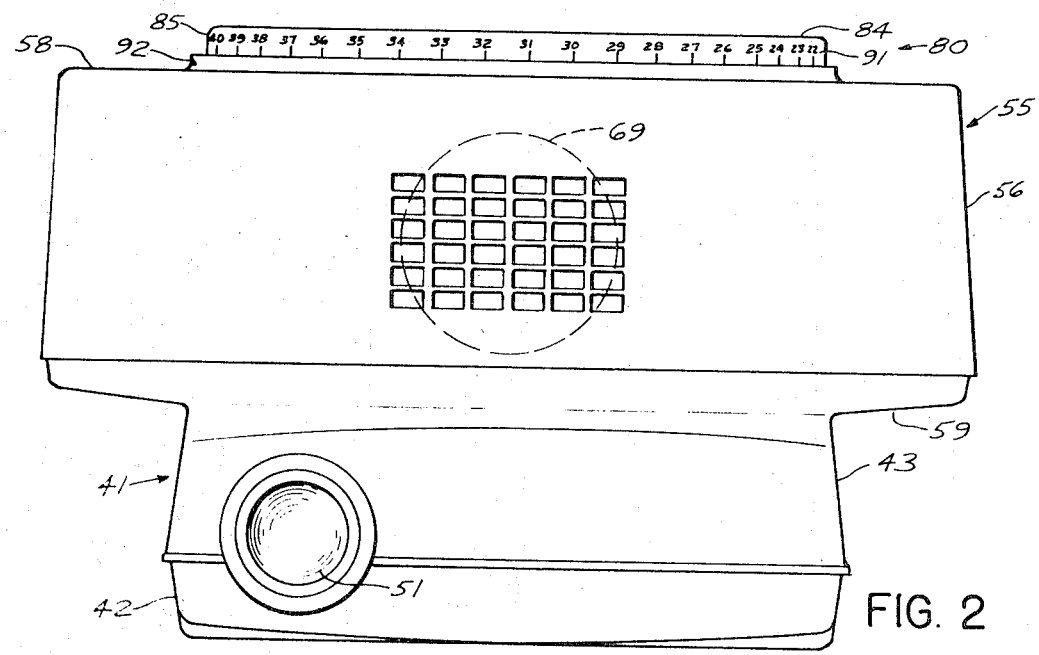
FIG. 2 is an elevational view of FIG. 1.

Referring now to the figures more in detail and first to FIGS. 1 to 4D, the exemplified projector according to the invention comprises a lower housing 41 which is composed of a base 42 and a surrounding part 43. Parts 42 and 43 may be made of any suitable material such as molded plastic. Part 43 supports horizontally disposed annular pate 44 which is continued at its inner periphery by a generally frustoconical part 45 extending downwardly to base 42, preferably resting upon the same. The annular plate is unbroken except for a generally radial slot 46. An inner part of a suitable bearing 48 such as a ball bearing or a roller bearing rises from the center of base part 42 as can best be seen in FIG. 3.

Lower housing 41 accommodates a diagrammatically indicated conventional projecting system 49 including a focusing lens 51 (FIG. 2) for projecting an image of a slide 50 in the direction of an arrow 52. The image of the slide should be visualized as being projected upon an external screen (not shown) in a conventional fashion.

The lower housing supports an upper housing 55 formed by an outer wall 56, an inner wall 57, a cover 58 and a bottom 59. The upper housing defines a generally annular shape 60 accommodating a drive mechanism 61 for the projector and electronic sound equipment 62. The electronic equipment should be visualized as being generally conventional. It may include a preamplifier 63, a power supply 64, controls 65, a VU meter 66, volume and tone controls 67 and 68 and one or several loudspeakers 69.

Drive mechanism 61 which will be more fully described hereinafter, is diagrammatically indicated in FIG. 1. Its principal components are a drive motor 101, a transmission 106 coupling the motor to a capstan 142 in a capstan assembly 118 as described later on, a magnetic head assembly 285 which may include one or several sound heads for playback or recording and an erase head.

Figure 3:
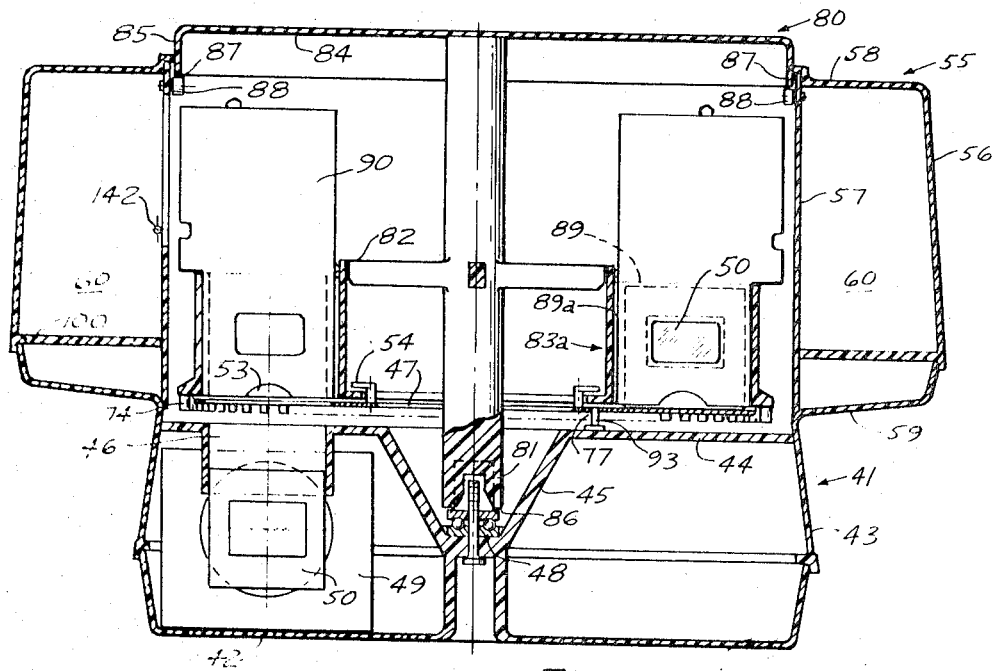
FIG. 3 is an elevational view, partly in section, of FIG. 1, taken on line 3—3 of FIG. 1.

Components 101, 106, 118 and 285 are all mounted on an annular platform 100 which is supported between outer wall 56 and bottom 59 of upper housing 55 as can best be seen in FIG. 3. Lower housing 41 and upper housing 55 further accommodate a rotatable assembly 80. This assembly comprises a lower support section 81 journalled upon bearing 48 on base 42, an upper support section 82, a cassette carrier or tray 83 which is preferably a molded body, for a supply of cassettes 90, a top cover 84 and a side cover 85.

Components 81 to 85 all have a circular cross-section and are joined to each other in a rigid unit terminating in an inner bearing member 86 at the lower end of section 81 and a smooth peripheral rim 87 at the lower end of cover 85. Several circumferentially spaced rollers 88 at the juncture of inner wall 57 of upper housing 55 and cover 58 support the entire aesembly 80 at rim 87.

Figure 1:
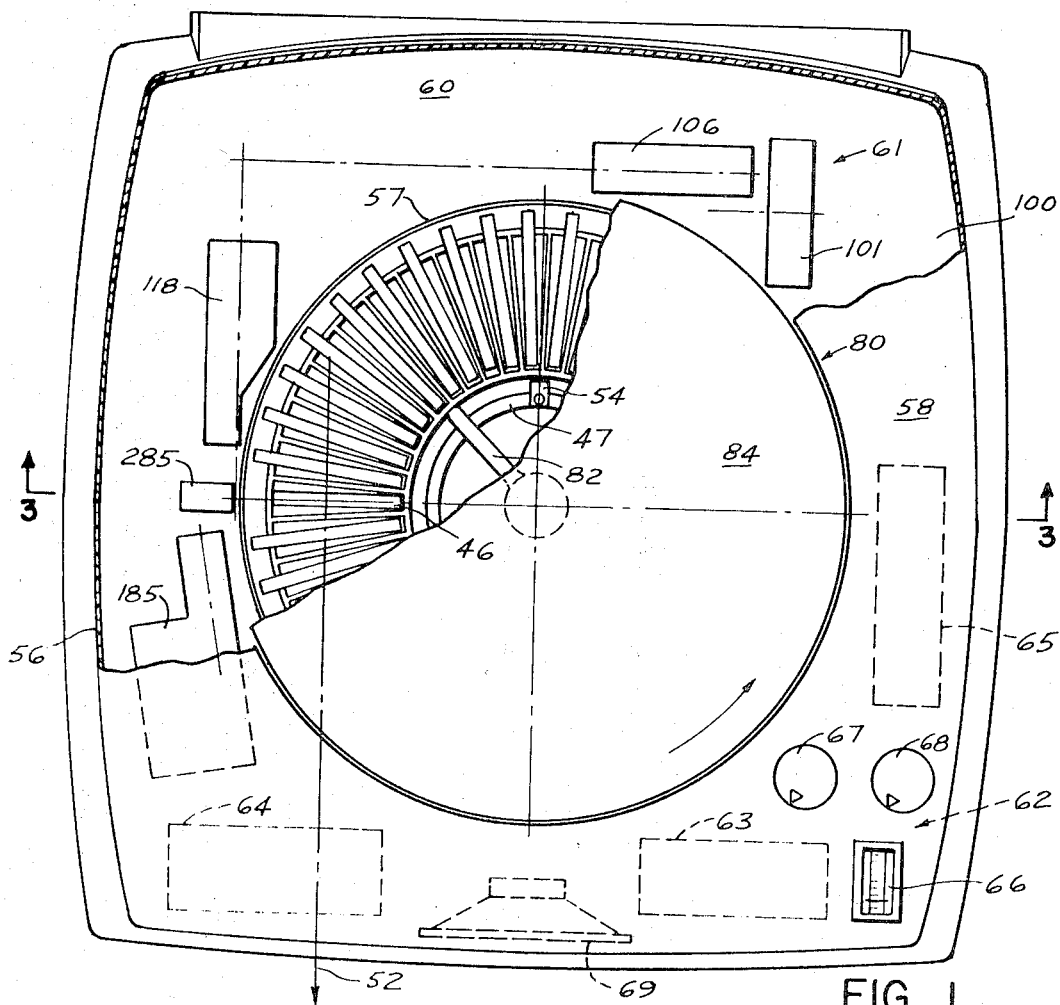
FIG. 1 is a plan view of a projector according to the invention, partly in section.
Figure 4A:
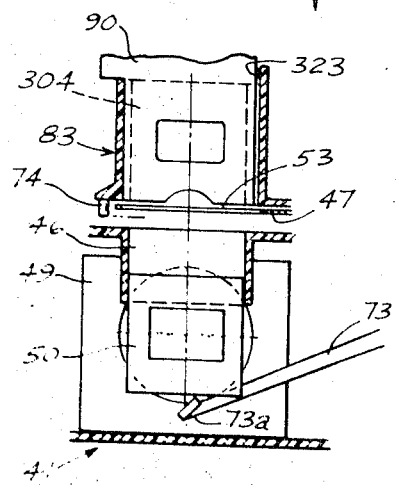
FIG. 4A is a fragmentary elevational view of FIG. 3.
Figure 4B:
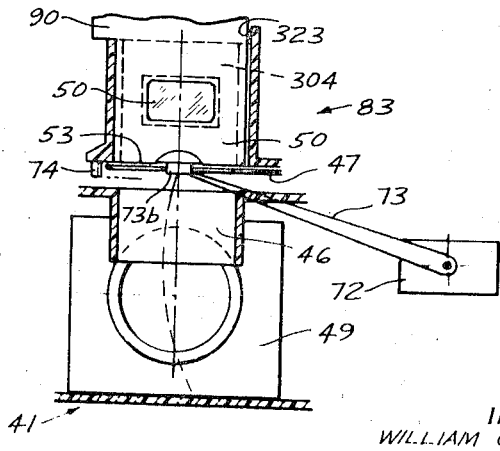
FIG. 4B is the same view as FIG. 4A but in another position of operation.
Figure 11:
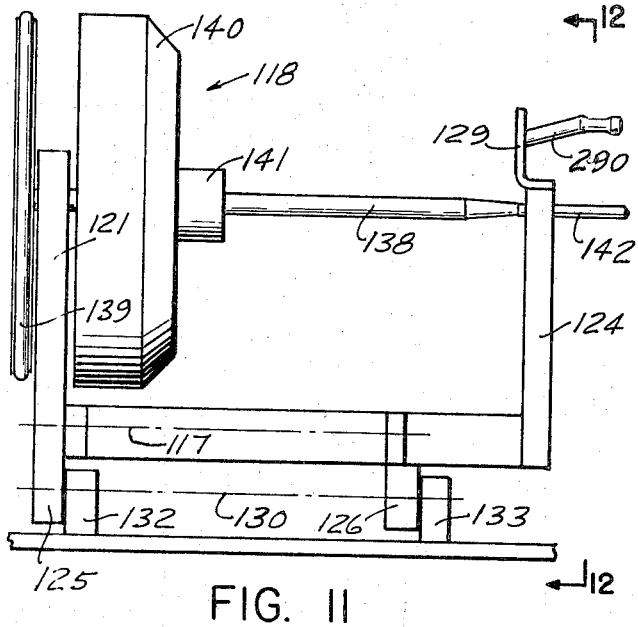
FIG. 11 is a fragmentary schematic elevational view of the capstan assembly.
Figure 12:
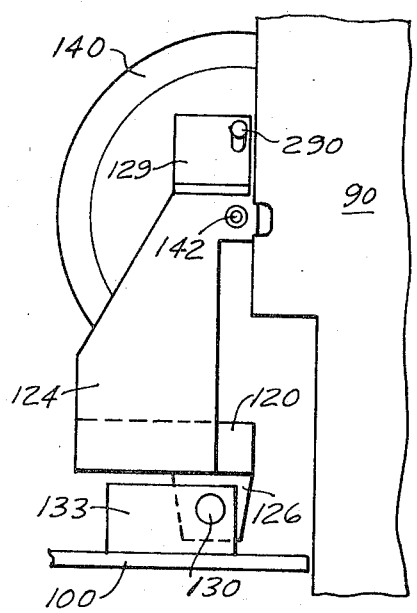
FIG. 12 is an edge view taken along line 12—12 of FIG. 11.

Tray 83 has a plurality of radial partition walls 89 which define within the tray forty-one radially disposed generally rectangular compartments 89a open at the top and the bottom as can best be seen in FIGS. 1 and 3. Cover 85 is marked on its outside with numerals 91 reading "0" and "1 to 40." The numerals are positioned to be placed selectively or successively in registry with a marker 92 on over 85 to index the cassettes within tray 83. Compartments 89a associated with numbers 1 to 40 are all filled with cassettes when the cassette tray is fully loaded. The numeral "0" constitutes a starting position as will be more fully explained hereinafter. As previously stated, the casette tray is open at the top and the bottom. The top opening of the carrier serves to load or empty the tray and the bottom opening permits movement of a slide 50 from its upper position into its lower or presentation position in which it is shown on the left-hand side of FIG. 3.

The bottom openings in the tray 83 are covered by an annular plate 47 including a radial slot 53, rotatably retained on the tray by brackets 54. As a cassette is inserted into the tray, the slide is freed, resting on plate 47. Thus the tray may be loaded separated from the projector as well. Removal of a cassette causes the same to grasp again the slide, thereby keeping the assembly of cassette and slide together. The means by which this action is accomplished will be described later. Upon insertion of tray 83 into the projector, plate 47 is turned so that a hole 77 in the plte is engaged by a pin 93 on plate 44. Slot 53 in plate 47 is now in alignment with slot 46 in plate 44. All the slides rest free on plate 47, slipping on the same as tray 83 turns. Only the one slide above slot 53 can drop through, under the control of a slide lowering and raising mechanism to be described later.

The presentation position of a cassette is the one in which the cassette is ready for projection and playback. Movement of a slide from its upper position into its lower position is effected in the exemplified apparatus by the use of gravity as directional force and more specifically by moving the cassette tray 83 from the position in which numeral "0" is in registry with marker 92 into a position in which any one of the compartments 89a is in registry with slot 46 in plate 44.

The means for raising a slide, rotating the tray one space and then lowering the next slide is now described by reference to FIGS. 4A, 4B, 4C and 4D.

An arm 73, a tray lock 75 and a rotating bar 76 are linked to an actuating means 72 which, upon application of an electrical current causes the three components to cycle in a synchronized manner. Means 72 and this cycle are covered in Pat. 3,276,314. The cycle is schematically reviewed as follows. Arm 73 moves from position 73a to 73b. As bar 76 moves radially out of position 76a, lock 75 moves parallel to itself from position 75a to 75b. Then bar 76 moves angularly to position 76b thereby causing turning tray 83 by engagement with respective pin 74. As bar 76 returns to position 76a, lock 75 also returns to position 75a. Finally, arm 73 moves from 73b down to 73a.

Tray 83 is circled with eighty-two pins 74 which are engaged by lock 75 and bar 76. It now becomes apparent how a slide is raised and held, while the tray turns, until it sets on plate 47. While there are eighty-two pins, the tray contains forty-one compartments. Therefore, two cycles of means 72 are required for the transport of one compartment 89a.

PROJECTOR MECHANISM

The whole mechanism of the projector acording to the invention, except the cassettes and the cassette tray, is mounted on base plate 100. Referring to FIGS. 5 and 6, capstan positioning motor 101 via a worm 102, a worm wheel 103, a gear 104 and a gear 105 rotates a shaft 106 mounted between bearings 107 and 108. Mounted with gear 105 on shaft 106 are cams 109, 110, 111 and 112. A bracket 146 on a rod 114 is shown depressing a switch 147, making cam 109 both a mechanical and electrical operator. Cams 110, 111 and 112 are electrical operators for switches 148, 149 and 150 respectively. The action of the four cams will be described later.

Cam 109 via a cam follower 113, a rod 114, a bell crank 115 rotatably supported on a pillar 116 produces linear movement of rod 117 from position 117A to 117B. A capstan assembly 118, via a spring 119 retained on rod 117 by a C washer 208, moves to the limiting position of FIGS. 7 and 8.

Referring now to FIGS. 7, 8, 9, 10, 11 and 12, capstan assembly 118 is carried on an integral assembly of parts (or a casting) comprising a base plate 120, upwardly extending support members 121 and 124; downwardly extending members 125, 126 and horizontally extending support members 127 and 128. Support 124 mounts a bracket 128 which in turn mounts a tape guide 290.

Assembly 118, in its linear movement, is supported and restrained as follows: a rod 130 is fixed in support 125, by a set screw 131, and passes through a base support port 132, suport member 126 and a second base support 133. The second support is designed not only to permit rotational movement of assembly 118 about rod 130 but also permits adjustment of the angular position of the assembly with respect to base 100. Mounted in the side of base 120 is a roller 134, coacting with a wide-shouldered post 135 adjustably threaded into a base-mounted nut 136 which is secured by a lock-nut 137. A capstan shaft 138, supported in support members 121 and 124 has affixed to it a sheave 139, a flywheel 140 having a collar 141 and terminates in capstan 142. Reverting to FIGS. 5 and 6, a capstan drive motor 143, via a belt 144 and sheave 139, rotates shaft 138. As seen in FIG. 6, belt 144 biases assembly 118 counter-clockwise while post 135 effects a clockwise restraint. The adjustability of post 135 is needed for critical positioning of capstan 142 with relation to the tape. Returning to FIGS.

7 and 10, bell crank 115 when turned clockwise is followed by assembly 118 due to the biasing effect of a spring 145 fixed between stationary support 132 and movable support 126.

A bell-crank 151 supported on a pillar 152 is acted upon by rod 117 and in turn, via a pin 153, an adjustment screw 154, a yoke 155 and a bearing 156, acts upon tape head assembly 285 in a direction and manner to be described. Also acting upon the tape head assembly in a different manner is a linkage comprising a post 158 shouldered at one end and terminating in a pinned link 159 at the other end and a spring 161, the post passing through a hole in an extension 160 of suport 124. The action of spring 161 is two-fold, to be described later.

The tape puller mechanism comprises a solenoid 162, a link 163, a bell-crank 164 rotatably mounted on a pillar 165 by an extending shaft 166 on which a helical spring 167 is fixed to post 165 at one end to bell-crank 164 at the other, an assembly 168 rotatable in a bushing 169 which is integral with the bell-crank, and an adjustable post 170 held on a pillar 171. Assembly 168 comprises a shaft 172 with a camming pin 173 and a spring holder 174 at the lower end and a clamp 175 at upper end in which are held tape puller wires 176 disposed vertically just clear of a capstan 142. A spring 177 biases assembly 168 clockwise with respect to bell-crank 164 to which it connects at a pin 178, and, as seen in FIGS. 7 and 8 is stopped by a pin 179 on 164. When solenoid 162 is energized, the bell-crank turns counter-clockwise. Just before completion of the turn, as determined by the solenoid armature traverse, camming pin 173 comes in contact with post 170. Due to the very small radius from the point of contact to the center of spring holder 174, the remaining slight rotation of bell-crank 164 produces a relatively large rotation of assembly 168 in bushing 169, as seen in FIGS. 9 and 10. The purpose of this action will be clarified later in the description of the cassette in operation.

Figure 13:
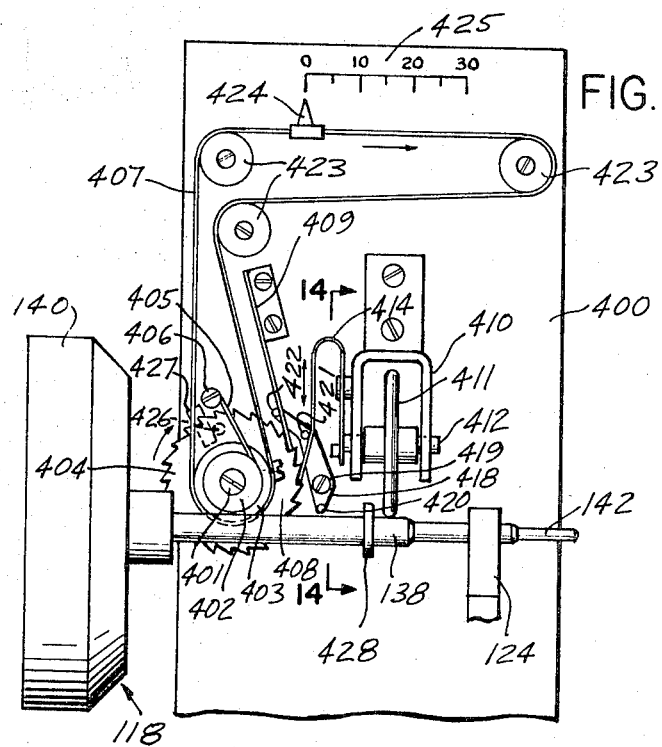
FIG. 13 is a fragmentary elevational view of an indicator indicating the length of a recording on the tape.
Figure 14:
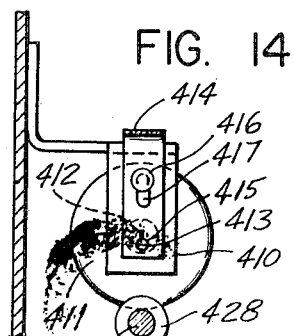
FIG. 14 is a fragmentary, partly sectional view taken along line 14—14 of FIG. 13.

FIGS. 13 and 14 show an assembly for indicating the amount of tape used for a recording. Such assembly is particularly useful when the recording of a massage is stopped and resumed at a later time.

The assembly comprises a plate 400 mounted on base 100 (not shown) behind capstan assembly 118. A post 401 mounted on a plate 400 spindles an indicator assembly including a housing 402 for a constant-torque spring 405 (known as a Neg-a-tor spring), a belt drive 403 and a ratchet 404. The constant-torque spring is anchored at a post 406 and a screw 408 anchors belt 407 to the belt drive. Ratchet 404 is held at any of its teeth by a detent spring 409.

A bracket 410 spindles a friction wheel 411 mounted on a shaft 412 and in driving engagement with capstan shaft 138. The shaft 412 also mounts an eccentric 413 engaging one arm of a generally U-shaped spring 414 through a hole 415 in said arm. The spring movement is limited by engagement of a shouldered post 416 with a slot 417 in the same arm. The other arm of the spring, and detent spring 409, are biased toward engagement with the ratchet teeth, and engage one of the teeth except when restrained by the action of a lever 418 pivotal about a pin 419 and carrying three lugs 420, 421 and 422.

Belt 407 is guided over pulleys 423 and mounts a pointer 424 coacting with a scale 425 calibrated, for instance, for length of tape or periods of time.

Counter-clockwise rotation of ratchet 404 is limited to the illustrated starting position by a pin 426 mounted on the ratchet and engageable with a limit stop 427 on plate 400.

As is now apparent, pointer 424 will advance along scale 425 in interrupted but uniform increments with each downward movement of eccentric 413. The constant-torque spring prevents excessive tension as may cause wheel 411 to slip on shaft 138.

At the end of a playback or a recording, when the capstan assembly 118 is retracted toward the left, a collar 428 on shaft 138 engages lug 420 of lever 418 thereby pivoting the lever clockwise. As a result, lugs 421 and 422 lift springs 414 and 409 respectively out of engagement with the teeth of the ratchet, which now snaps back into the illustrated started position.

A tape rewind mechanism 185 comprises a motor 186 driving on the same shaft a worm 187 and a pulley 207. Worm 187 via a worm wheel 188, a gear 189 and a gear 190 drives a cam 191. Worm wheel 188 and gear 189 are pinned together and turn on a post 192, while gear 190 and cam 191 are pinned to shaft 180 and turn in a bearing plate 193 jutting from a support 194 which also supports solenoid 162. Shaft 180 extending downward to a base bearing also has pinned to it cams 181 and 182 operating switches 183 and 184 respectively. Another post 195 supports a rotatable shaft 196 to which is fixed at the lower part an adjustable clamping bracket 197 and at the upper end a bearing block 202. For purpose of clarity, shaft 196 is broken and the upper portion is displaced as indicated by the arrow in FIGS. 7 and 9. Bracket 197 carries a cam follower 198 and a support post 199 for a spring 200. This spring is fixed at its other end to a pin 201 on support 194 and serves to bias shaft 196 and its attachments counter-clockwise against cam 191. Block 202 supports a shaft 203 which at one end carries a V-grooved rewind disc-shaped capstan 204 and at the other end a pulley 205 connected to a pulley 207 by a belt 206.

When motor 186 is energized, rewind capstan 204 will rotate while it moves from the position of FIG. 7 to that of FIG. 9 and back again in a manner to be described later.

TAPE DRIVE AND CASSETTE STRUCTURE

Referring to FIGS. 15 through 20, the construction of the magnetic heads and capstan pressure roller supports will now be described. A post 275 mounts a pin 276 which trunions a U-shaped bracket 277. The face of the bracket as seen in FIG. 17 supports near its lower end a shouldered pin 278 and below that an adjusting screw 279. Movement of the bracket 277 counter-clockwise stops when screw 279 butts against post 275. Bracket 277, inturn, by means of a pin 280 trunions a pressure roller 281. A wire spring 282 passing through a hole in pin 280 biases the pin to the right as seen in FIG. 15. The far face of bracket 277 trunions bearing 156 on yoke 155 (FIGS. 7 and 10). A post 278 trunions an integral unit 285 comprising a plate 283 and a shaped arm 284. A soft felt or rubber spacer 265 separates unit 285 from bracket 277. A post 286 engages bracket 159.

Referring to FIGS. 9 and 10, movement of assembly 118 to the right will cause unit 285 to move into its vertical position before spring 161 is compressed as there is no resistance by the unit. At this point, pin 153 comes into contact with screw 154. Upon further movement of assembly 118, yoke 156 will turn clockwise the whole assembly of bracket 277 and unit 285. Unit 285 is prevented from turning clockwise beyond the vertical position, as seen in FIG. 15, by an extension 159A on bracket 159 abutting against the far side of bracket 277 as seen in FIG. 16, and thus the remaining movement of assembly 118 is taken up by compression of spring 161. To ensure that the mechanism, terminating at the free end of screw 154, follows pin 153 on the return stroke, a spring 289 on pin 276 bearing on the base of a slot in post 275 biases the mechanism counter-clockwise as shown by the arrow in FIG. 18. The purpose of the aforesaid action is to ensure that tape heads 287 and 288 are in a substantially vertical position before moving in toward the cassette and remain in such position when moving away from the cassette. An arm 292 pivoted at 293 has a rounded button 294 at its upper end and contacts a switch 295 at its lower end. A spring 296 biases the assembly clockwise into one position of operation of switch 295. When a cassete moves into and is in place, button 294 moves back. Switch 295 is then free to move into the alternate position of operation.

The cassette 90 is comprised of two substantially matching but mirror-imaged molding parts 301 and 302 which when assembled define two cavities 303 and 304. In cavity 303 bearing posts 306 and 306a spindle tape drums 307 and 308 respectively. Drum 307 has at its far side (FIGS. 16 and 18 a tape winding surface 309. Its near side 310 has an annular groove which receives a ring 311 made of a plastic material such as Neoprene. Drum 308 has at its far side a tape winding surface 312. Its near side 313 has the same diameter as the outer diameter of ring 311. By a spatial disposition of the two rotational centers 306 and 306a of the drums so that it is slightly less than the diameters of ring 311 and the near side 313 of drum 308, frictional contact is maintained between the drums. Tape winding surface 309 is slightly less in diameter than surface 312. Compensation due to the difference in winding rates is accommodated by having tape 315 slightly loose on drum 308 at the start of playback. The tape will not pull on the capstan and, when rewound by capstan 204, the tape will be tightly wound on drum 307. While the sound carrier has been referred to as "tape" in the specification and the claims for sake of simplicity, it should be understood that the concept of the invention also encompasses the use of magnetized wire.

As tape 315 moves from drum 307 to drum 308 it passes over tape guides 316 and 317. Partitions or ribs 318 and 319 prevent the possibility of the tape flapping during rewind and coming in contact with ring 311 on drum 307, particularly when capstan 142 retracts and releases the out-of-line excess of tape as seen in FIG. 16. Tape guide 290 on bracket 129 is disposed to pass between the tape heads as brackets 129 and 284 move relative to each other.

Referring to the tape puller mechanism as best shown in FIGS. 15, 17, 19 and 20, wires 176 first swing into a position behind tape 315 as shown in FIG. 19. This position corresponds to the point of operation aforedescribed when pin 173 comes into contact with post 170. Cutouts 320 in both cassette parts 301 and 302 accommodate the entry of the wires. At the end of the remaining rotation of bell-crank 164 and assembly 168, as seen in FIGS. 9 and 10, the wires have pulled the tape out of the cassette as shown in FIG. 20. The lower one of the wires 176 pushes the tape against roller 281 and yields while the upper wire pushes the tape somewhat further, again limited by roller 281. It now is evident that linear movement of capstan assembly 118 will place capstan 142 and tape guide 290 behind the tape 315. The wires on return to the position of FIG. 19 will clear capstan 142. The tape puller mechanism can be similarly controlled by a cam system.

FIG. 16 shows that the tape now has a partial wraparound at both magnettic heads 287 and 288. This wrap improves the quality of the signal and creates drag to prevent tape spillage off drum 307. Also, guiding the tape in the reduced section 291 eliminates slewing at the heads.

Returning now to the description of the cassette, in playback, capstan 142 pulls tape 315 which rotates drum 307 which, in turn, rotates drum 308 upon which the tape winds. For rewind, motor 186 rotates capstan 204 which, by the action of the gear and cam train, is brought into contact with Neoprene ring 311 as shown by an arrow in FIG. 18. The friction drive of ring 311 on the near side 313 of drum 308 now serves to control the tape run-off.

Cavity 304 has slide aperatures 321 in both parts 301 and 302 and accepts slide 50 into alignment with the apertures. The lower edge walls of the cavity are widened to allow for error in the alignment with the associated slide rasing mechanism (not shown) and/or slight variations, or wear on the width of the slide. A lever 323 on a post 324 is biased clockwise by a light spring 325 set on a post 326 until a projection 327 on lever 323 comes in contact with the wall of the cartridge as seen in FIG. 20. It can be seen that inserting a slide will bias lever 323 counter-clockwise permitting the slide thereafter to be held by frictional contact until insertion of cassette 90 in tray compartment 89a releases the slide. It can also be seen that removal of a cartridge not in the projection position will hold the slide (picture not showing).

The cassette may incorporate a thumb notch 329 for manual removal of the slide, which may also be released by depressing lever 323.

OPERATIONAL CYCLE

The description of the operational cycle of the projector as hereinbefore described begins with slide projection and tape playback just started. FIG. 26 shows tthe schematic as energized during this progress. The cam operators are indicated in simplified form acting on the associated switches.

Power switch 157 is closed to connect the projector to a 60 Hz. supply. Sound electronics equipment 62 and capstan motor 143 are energized. Projection lamp 330 (and its fan) is switched on due to closed contact 8–9 of relay 331 and contact 566 which is closed when plug 567 is removed. (The operation of serial connection of contact 4–5 in relay K1, when plug 567 is inserted and multiprojector control 510 is in use, will be explained further on.) Playback proceeds through preamplifier 63, volume control 67, audio amplifier 354 and speaker 69.

At the completion of playback a 60 Hz. tone impressed on the tape is played back through preamplifier 63. This signal passes through a frequency selective 60 Hz. amplifier 352 to an electronic switch 353 which in turn energizes relay 332. Contact 4–5 of relay 332 closes and drive motor 101 starts whereby through cam 109 and its follower train 110, 111 and 112 the withdrawal of capstan assembly 118 is started. Magnetic head assembly 285 also starts its motion away from the tape toward the positions of FIGS. 17 and 18, as shown by the arrow. Pressure roller 281 frees the tape before capstan 142 is withdrawn. This is explained by reference to FIGS. 7 through 10. As soon as rod 117 begins to move, yoke 155 is freed and spring 289 turns unit 285 through a small but adequate distance. Capstan 142 is delayed slightly by the easing of spring 119 which is slightly stronger than spring 145. When capstan assembly 118 starts to move, extension 160 of support 124 comes into contact with the head of post 158, and arm 284 turns. Relay 332 remains energized through its contact 1–2 and switch 147. Hence, drive motor 101 remains energized via contacts 4–5 of relay 332.

After a very short time during which drive motor 101 is running, cam 110 switches switch 148 from contact 3 to 1. Now voltage is supplied to rewind motor 186 via contact 4–5 of energized relay 332, hold switch 334, switch 148, contact 7–8 of relay 332, contact 1–2 of switch 184, and hold switch 334. As soon as the rewind motor starts, switch 184 transfers its contacts from 1 to 3. Now voltage is supplied via switch 184 and hold switch 334 to the rewind motor which continues to run. This last transfer is necessary because momentarily, after switch 184 operates, switch 147 transfers its contacts from 1 to 3, relay 332 is deenergized, its contact 4–5 opens and drive motor 101 is stopped.

Rewind motor 186, through its gear train and cam 191 brings capstan 204 into contact with cassette Neoprene ring 311 and the tape rewinds as shown in FIG. 18. The rewind time may be fixed by way of example at three seconds, based on the playback time of the tape filling the reel. Cam 191 then returns capstan 204 to the out position. Just before the end of rewind, cam 181 transfers switch 183 to contact 3. Voltage is supplied via switch 183 to restart drive motor 101. Cam 110 transfers switch 148 back to contact 3. At the end of rewind, cam 182 transfers switch 184 back to contact 1 and stops rewind motor 186. Motor 101 does not stop because it now receives voltage via contact 2-3 of switch 147, cassette switch 295, contact 2-3 of switch 148, and hold switch 334. Next, cam 112 transfers switch 150 to contact 1, energizing relay 331. Contact 8-9 of relay 331 opens, turning off the projector lamp 330. Contact 4-5 of relay 331 closes, energizing the cassette advance means 72. Cam 112 operates for the time required for the double cycle of means 72 (FIG. 4D), placing the next cassette and thus the next slide in position. Switch 150 returns to contact 3, relay 331 is deenergized and the projector lamp is switched on.

Just before the end of the cycle for motor 101, cam 111 transfers switch 149 to its contact 1. Voltage is supplied via contact 2-3 of switch 147 and switch 149 to tape puller solenoid 162. The tape is now moved out in front of capstan 142 and guide 290. As cam 109 moves capstan 142 and tape guide 290 into operating position, cam 111 returns switch 149 to contact 3. Spring 167 returns the tape puller to the out position. Cam 109 finally operates switch 147 and motor 101 stops. As the mechanism is now in the position described at the beginning of the operation, the playback cycle has been completed and the next cycle is started.

The tray need not be filled with cassettes. If a cassette space 89a comes into position, switch 295 will be biased to the out position. This breaks the current to motor 101 (which was energized as previously described when cam 112 operated switch 150) and leaves relay 331 energized. The lamp will remain switched off and means 72 will cycle the tray to the next position or as often as necessary until motor 101 is started to complete the interrupter portion of the cycle.

The 60 Hz. signal, referred to above as operating at the end of playback, is impressed on the tape when switch 351 is in the record mode and button 355 is momentarily depressed.

There are three controls incorporated into the schematic, to wit, Reject, Repeat and Hold.

Depressing the "Reject" button 335 duplicates the action of electronic switch 353 at the end of playback and starts the cycle of drive motor 101.

Depressing the "Repeat" button 333 prevents energization of relay 331. The cassette will not move out. The lamp stays on while motor 101 cycles, the tape rewinds, is pulled out from the cassette and repeats its playback.

Depressing the "Hold" button 334 stops one or both motors 101 and 186. Playback will be completed but not repeated.

SUMMARY OF OPERATIONAL CYCLE (1) Power is switched off and tray is at "0" position.
(2) Power is turned on and:

Optical system and sound system are energized.
Playback capstan motor starts rotation of capstan.
Slide support arm 73 rises.
Tray is turned to cassette "1" position.
Slide support arm 73 lowers, carrying down slide 50.
Playback capstan starts moving in.
Tape puller engages tape to pull the tape out of the cassette and toward a pressure roller.
Playback capstan completes movement to final position behind tape, as magnetic heads and pressure roller move in.
Tape puller retracts.
Playback starts and tape use indicator starts.

(3) Playback stops and 60 Hz. signal triggers remainder of cycle.

Playback capstan, magnetic heads and pressure roller retract.
Tape rewind motor starts the rewind capstan.
Rewind capstan moves into engagement with tape supply reel in cassette and rewinds tape.
After three seconds (maximum rewind time presumed to be required) rewind capstan moves out and stops.

Slide support arm 73 is raised for return of the slide of No. 1 cassette.
Tray is turned to "2" position.

(4) Projector is ready to start new cycle.

Referring to FIGS. 21 through 28, in order to use the master projector from control of two other projectors, master 512 is connected to a control box 510 with a cable 356 having connectors 567 and 568 and by a power cord 567 in receptacle 537. Slave I (520) is a slide projector connected at terminals 570 and by a power cord 538 in a receptacle 539. Slave II is either a slide projector, in which case it is connected at terminals 572, or a motion picture projector, 522 in which case it is connected to terminals 587, which in turn, are connected to cable 586 to terminals 585. A power cord 588 is connected to a receptacle 589.

Figure 23:
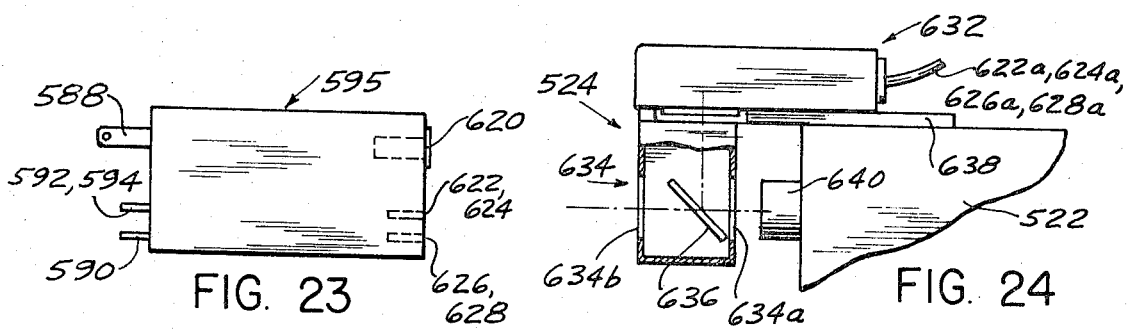
FIG. 23 is an external view of a photoelectric adapter box used with the control box for motion picture projector adaptation.

With a motion picture projector as second slave projector it is necessary to match its functions to that of the automatic still picture projector 520 which is provided with a separate switch for its lamp and is capable of being cycled to the next slide through a circuit separate from its power circuit. To achieve such match, a photoelectric adapter box 595, as shown in FIGS. 23 and 28, is used as an intermediary between the control box 510 and the motion picture projector 522. This will be described further on. For the purpose of clarity in the following description of electronic switching only, it is desirable to assume that a slide projector rather than a motion picture projector is connected to terminals 572 as slave II.

A selected frequency tone such as a 30 Hz. tone is used for triggering a change in the projector. The first 30 Hz. tone turns off lamp 330 in master 512 and turns on the lamp of slave 520 (not shown). The next 30 Hz. tone turns this lamp off and turns on the lamp of slave 522. Finally, at the end of the message, a 60 Hz. (which is the standard U.S. net frequency or any other frequency or any other frequency selectively different from the 30 Hz.), will advance all three projectors. This is accomplished as follows:

On closing switch 550, 24 v. AC is supplied to relays 357, 358 and 359. To start the program, reset button 360 is depressed. This applies a positive voltage to the gate of electric switch 361, in turn energizing relay 357. Lamp 330 goes on due to closure of relay contact 4-5. When relay 357 is energized, relays 358 and 359 are deenergized. Upon release of a reset button 360, relay 357 is maintained energized through its contact 1-2.

For recording this program, switch 351 is in record mode. At the moment of wishing to change to slave I, a 30 Hz. tone button 364 is depressed, putting the signal on the tape via play-back sound head 288. At the same time relay 357 deenergizes and relay 358 energizes. Lamp illumination transfers from master to slave I. At the next desired movement of transfer to slave II, depression of a button 364 deenergizes relay 358 and energizes relay 359. Lamp illumination transfers to slave H. At the end of the message, a 60 Hz. tone button 355 is depressed. This rejects the cassette and all three projectors advance.

The operation will be described in greater detail in conjunction with a cassette on the tape of which, in addition to the message, has been impressed two 30 Hz. tones signal at 20 seconds and 55 seconds from start of the message—that is, at selected intemediate points thereof—and an end-of-message 60 Hz. tone after 110 seconds of play. Of course, any other suitable periods of time may be selected.

On playback, at 20 seconds the first 30 Hz. tone passes, via sound head 288, switch 351, preamplifiers 63, cable 356 and level control 365, to amplifier 366 which is made frequency selective by a T filter 367. The amplified 30 Hz. signal is applied to an electronic switch 368 which now produces a negative voltage. This voltage, applied to gates 361 and 362, deenergizs relay 357 and turns off lamp 330. Contact 1-3 close thereby applies voltage to a gate 362, thus energizing relay 358. The charge on a capacitor 369 prevents a gate 363 from receiving voltage during the switchover of voltage from gate 361 to gate 362.

After 55 seconds, the second 30 Hz. tone signal again puts a negative voltage at gates 361 and 362. Gate 361 remains unaffected because it is already turned off. However, gate 362 will now turn off and and deenergize relay 358. A capacitor 369, having discharged soon after the first Hz. signal, the negative voltage at gate 363 no longer exists. Therefore, with contacts 1-3 on relays 357 and 358 closed, gate 363 is turned on and relay 359 energizes. Lamp illumination transfers from slave I to slave II via contacts 4-5.

After 110 seconds, the 60 Hz. tone signal passes via sound head 288, switch 351, preamplifier 63 and amplifier 352, to electronic switch 353. Relay 332 energizes and operation proceeds as described earlier for recycling. At the time that relay 331 energizes, relay 370 is also energized, as they are in parallel. Gate 361 is turned on via contact 1-2 of relay 370. Closing of contact 4-5 of the relay will advance slave I (slide projector) by one step by closing a suitable circuit in the projector (not shown). Relay 357 energizes; relays 358 and 359 deenergize and the cycle starts over again with following cassettes.

Figure 21:
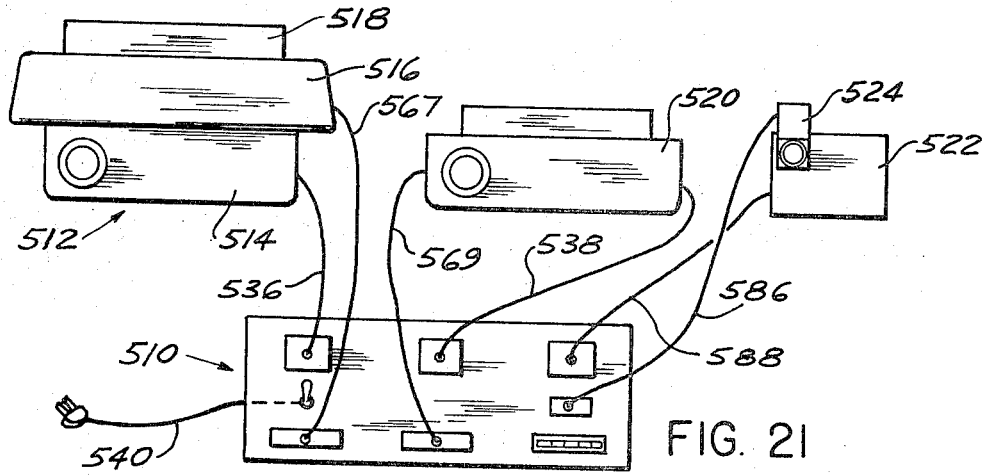
FIG. 21 shows diagrammatically a complete multiple projector control system according to the invention.
Figure 22:
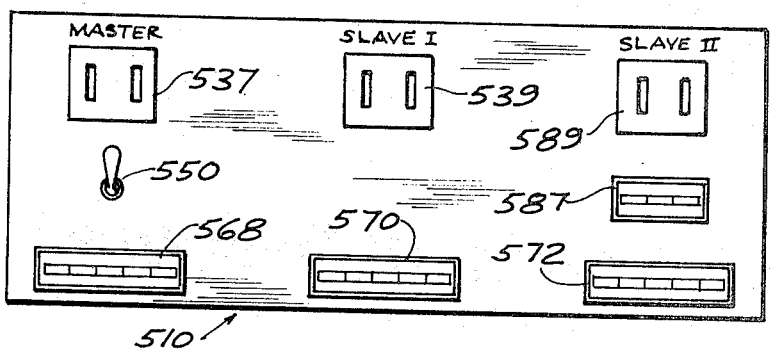
FIG. 22 is an external view of the multiprojector control box.

Returning now to the use of a motion picture projector as slave II, there is shown in FIG. 21 an arrangement in which a multiprojector control box 510 is connected to a master soundslide projector shown generally at 512, and comprising an automatic slide projector 514 of, for instance, the Carousel type; an adapter 516 for converting the projector to accept sound and slide cassettes, and a magazine 518 containing a number of cassettes, each containing a slide and a sound record carrier having recorded thereon a message. Each slide and the associated sound record carrier such as tape constitute a presentation unit. The control box is also connected through suitable cables, to the described, to a first conventional automatic slide projector 520 without sound equipment which may also be of the Carousel type, a second projector 522 which may be either another conventional automatic slide projector or a motion picture projector and a photorelay box 524 which coacts with the projection lens of the motion picture projector, projectors 520 and 522 constituting the slave projectors. Although any motion picture projector is suitable for use with the system, a magazine type of 8 mm. projector such as the Technicolor 800 projector is preferred.

Stated briefly, the function of multiprojector control box 510 is to start master projector 512, receive signals from the tape, and successively turn off the slide advance in the master projector while permitting the sound pickup head to operate, turn on the first slave projector 520, turn off the first slave projector, simultaneously turn on the second slave projector 522, turn off the second slave projector and recycle the master projector 512 to take its next slide while advancing each slave projector to its next slide or portion of motion picture film, as appropriate.

Turning now to FIG. 28, contacts 593 and 594 connect to the 24 v. AC supply through relay 359 contact 6-7. When the signal to start is received via contact pin 590, a relay 600 is energized. Relay contact 602 closes before relay contact 604 opens. Relay contact 606 also closes and, in turn, energizes a relay 608 causing the same to close its contacts 610 and 612.

The closing of contact 602 of relay 600 provides AC voltage at normally closed contacts 614 of a delay switch 616 shown here as a thermal delay switch, although other types are equally suitable. Simultaneously, contact 612 of relay 608 energizes a heater element 618 in the delay switch.

Contact 610 of relay 608 supplies mains power from connector 588 to a socket 620 at the front of the adapter box (FIG. 23). Pins 622 and 624 of a four-pin socket also are now provided with mains power. The remaining pins 626 and 628 of the socket are connected across contacts 614 in delay switch 616. A projector plug 630 is connected to socket 20 and a four-pin plug attached to a photorelay 632 is connected to the four-pin socket. Pins 622a and 624a of this plug provide mains powers to the photorelay which remains closed only while illuminated. Thus, as long as either contact 614 of relay switch 616 is closed or photorelay 632 receives light, relay 600 remains energized.

Figure 24:
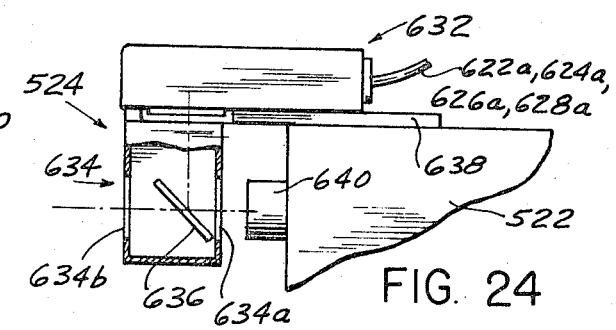
FIG. 24 shows a light relay used with the motion picture projector.

Referring now to FIG. 24, it can be seen that photorelay 632 a box 524, portion 634 of which has openings 634a and 634b, and contains a beamsplitter 636 set at 45° to the optical axis of the lens. Box 524 is supported by a bracket 638 which carries the photorelay in light-receiving relation to the beamsplitter and to a projector lens 640.

Figure 25:
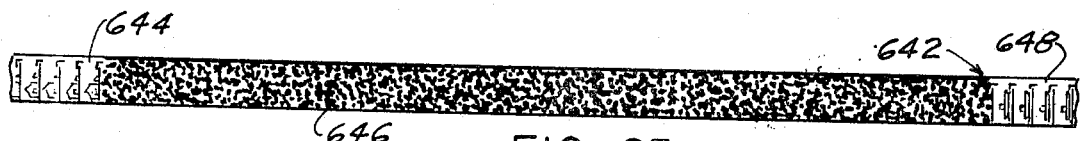
FIG. 25 shows a section of motion picture film adapted to coact with the light relay.

FIG. 25 shows a film 642 as used in motion picture projector 522. It comprises a plurality of frames depicting motion picture sequences or messages 644 and 648, the sequences being each separated by an opaque film section 646 which may be 10 to 30 frames in length, or as desired to fulfill the necessary function to be described.

In operation, the signal received through contact pin 590 starts the motion picture projector which as previously described, constitutes the second slave projector. The circuit through contact pin 590 is closed through contacts 614 which are closed in asmuch as the projector starts with an opaque film section 646 of film 642 in the gate and no light reaches photorelay 632 initially. After approximately one-half to one second, the opaque section of the film clears the gate and the first picture message starts. Sufficient light reaches photorelay 632 via beamsplitter 636 at this time to close the circuit to socket pins 626 and 628. Within three to five seconds, delay switch 616 opens due to the heating of heating elements 618 via relay contacts 612, but relays 600 and 608 are kept energized through photorelay 632. At the end of the first message, a new opaque section enters the gate, photorelay 632 opens, relays 600 and 608 now open and all power is interrupted including that to projector 522 via contacts 610, socket 620 and plug 630. Projector 522 coasts to a stop within a few frames, leaving some portion of the opaque section of film 642 still in the projector gate. Upon receiving its next signal from the control box, the cycle is repeated and projector 522 projects the next message sequence on the motion picture film.

It should be noted that this arrangement requires only that the motion picture message time be not longer than the cycle time set by the tape. With this condition established the projector will complete its message, since closing of relay 600 makes the adapter box 516 independent of the signal from contact 90; it receives continuous power from contacts 594 and 592 and can thereby complete its cycle. Furthermore, the opague section acts to resynchronize each new message portion, in turn, thereby avoiding cumulative errors in timing.

If desired, conventional message recording means 701 including microphone and amplifying means may be connected via a switch 702 to the circuitry as is diagrammatically indicated in FIG. 26.

What is claimed is:

1. A sound slide projector for cassettes each having a casing including a rotary support for unwinding and rewinding magnetic tape having recorded thereon a message and a compartment for releasably housing therein a slide, said projector comprising in combination:

positioning means for successively moving cassettes placed in the projector into and out of a presentation position;

an optical system for projecting slides;

a sound system for playing back the message recorded on the magnetic tape, said sound system including a sound head movable into and out of a position coacting with the tape in a cassette placed in the presentation position;

said positioning means comprising a support means including a slot permitting passage of a slide of a cassette in said presentation to a projection position but blocking passage of the casing of said cassette, a tray including locating means for receiving thereon a plurality of said cassettes and holding the same in a mutually fixed relationship, said tray being movably supported on the support means for moving successive cassettes into registry with said slot to effect passage of the respective slide into the projection position, said position of registry of a cassette constituting the presentation position thereof;

said optical system being arranged to project a slide in the projection position;

slide return means for returning a slide from the projection position into the respective cassette;

sound head moving means for moving said sound head into and out of coaction with the tape in a cassette in the presentation position;

a common tape playback mechanism for all cassettes, said mechanism including rotary drive means for forward winding of the tape of the respective cassette;

a common tape-rewind mechanism for all cassettes;

electrically operated cycling means energizing said sound system, moving the tray into a position in which one of said cassettes is in the presentation position, energizing the tape playback mechanism, activating the sound head moving means for moving the sound head into coaction with the tape; deenergizing the sound system; activating the sound head moving means for moving the sound head out of coaction with the tape, denergizing the common tape playback mechanism, energizing the common tape rewind mechanism, deenergizing the tape-rewind mechanism and activating the slide return means in a predetermined sequence and time relationship; and electronic control means for controlling said cycling means, said control means including a tape having recorded thereon in addition to the message a frequency tone signal past the end of the message, electronic switching means responsive for operation to said frequency tone signal, circuit means including said sound head means and said switching means to operate the latter upon reception of the signal via the sound head, said switching means being connected in circuit with said cycling means to activate the latter for a cycling operation upon operation of the switching means.

2. The projector according to claim 1 wherein said tray comprises a plurality of partition walls mounted on one side of the tray, each two adjacent partition walls defining a cassette compartment therebetween open at the bottom, said support means being disposed adjacent to the open side of the tray for retaining all the slides in the cassettes except the slide in registry with said slot.

3. The projector according to claim 2 wherein said tray is in the form of a drum and is rotatably supported on said support means, said compartments and said passage slot being substantially radially disposed with reference to the rotational axis of the drum.

4. The projector according to claim 1 wherein said support means comprise an upper platform and a lower platform, the upper platform including said passage slot, and the tray being movably supported on said upper platform whereby a slide in a cassette in registry with said slot can pass through the same upon the lower platform.

5. The projector according to claim 4 wherein said slide return means comprise a movable arm engageable with a slide in registry with the slot to support said slide, movement of the arm toward the lower platform lowering the supported slide and movement of the arm toward the upper platform lifting said slide into the compartment of the respective cassette, said cycling means including control means controlling said movements of the arm in a predetermined sequence and time relationship.

6. The projector according to claim 1 wherein said tape playback mechanism comprises a playback capstan; mounting means mounting said capstan for axial and rotational movement; drive means coupled with said capstan for axially and rotationally driving the same; a tape puller mechanism engageable with the tape in a cassette in said presentation position for pulling a portion of the tape from an inactive position into a position of coaction with the capstan, said cycling means including control means controlling the movements of the capstan and of the tape puller mechanism so as to cause, in a predetermined sequential order and time relationship, pulling of a portion of the tape out of the respective cassette, then axial displacement of the capstan into a position behind the tape relative to the respective cassette and into coaction with the tape for driving the latter, then withdrawal of the tape puller mechanism from the tape, and finally, axial withdrawal of the capstan from said coacting position thereby freeing the pulled-out tape portion for return into the respective cassette.

7. The projector according to claim 6 wherein said tape puller mechanism comprises a tape gripper means movable between a retracted position spaced apart from the tape and a forward position for gripping said portion of the tape to pull the same out of the cassette casing upon movement of the gripper means into said forward position, said control means controlling the aforesaid movements of the capstan and the tape gripper means in said predetermined sequential order and time relationship.

8. The projector according to claim 6 wherein said tape gripper means comprise gripper elements extending between said tape portion and the cassette casing in the forward position of said gripper means.

9. The projector according to claim 6 wherein said cycling means further include control means for controlling said sound head moving means to move the sound head into coacting engagement with the tape when the playback capstan is placed behind said tape portion.

10. The projector according to claim 1 wherein said common tape rewind mechanism comprises a rewind member movable into and out of driving coaction with said rotary support for the tape in a cassette in the presentation position; and drive means for driving said rewind member, said cycling means including rewind control means effecting movement of said rewind member into said coacting relationship and retraction thereof in a predetermined sequential order and time relationship.

11. The projector according to claim 10 wherein said rewind member comprises a capstan in the form of a drive wheel and said rotary support comprises a supply reel, said rewind capstan being movable by said control means into and out of rotation transmitting frictional engagement with the peripheral rim of said supply reel.

12. The projector according to claim 1 wherein said cycling means comprise drive means for stepwise moving said tray to place successive cassettes in the presentation position, and said cycling means include control means controlling first said tray drive means for moving the tray through part of one step, then the slide return means for returning a slide into the projection position to the respective cassette in the presentation position, and again the tray drive means for completing said one step.

13. The projector according to claim 1 wherein said sound system further comprises movable tape pressure means engageable with said tape for pressing the same into a wrap-around engagement with said sound head, and wherein said cycling means include control means for moving said tape pressure means into said engagement with said tape substantially simultaneously with the movement of the sound head into engagement with the tape.

14. A sound slide projector according to claim 1 and further comprising an indicating means for indicating the length of the tape portion occupied by the recording, said indicating means including a rotary stepping means, transmission coupling said rotary drive means of the playback mechanism to said stepping means for stepping the latter in accordance with the rotation of the drive means, and indicating means having a displaceable indicating member, said indicating member being coupled to said stepping means for displacement of said member by uniform increments corresponding to the stepping of said stepping means whereby the displacement of the indicating member is indicative of the length of said tape portion.

15. A sound slide projector according to claim 14 wherein said stepping means comprises a ratchet means including a ratchet wheel and a pawl biased toward engagement with any one of the teeth of said wheel and drive means for driving said wheel and displacing said indicating member, and wherein said transmission means comprise eccentric means and actuating means coupled with said eccentric means and said drive means, said actuating means being controlled by the drive means and actuating the eccentric means, said eccentric means when actuated coacting with said pawl to lift the same out of the engaged tooth of the ratchet wheel to free said wheel for a corresponding incremental rotation.

16. An audio-visual system comprising a master projector arranged to play back an audible message recorded on tape and to project a visual message; a slave projector arranged to project a visual message electrically operated; cycling means operating said master projector to play back the audible message for a predetermined period of time and to project the visual message during a predetermined part of said period, operating said slave projector to project its visual message during a predetermined part of said play-back period whereby the two projectors share the audible message play-back time and disconnecting the projection of the visual message by the master projector during said play-back period; and electronic control means for controlling said cycling means, said control means including a tape having recorded thereon in addition to the message a first frequency tone signal and a second frequency tone signal of a frequency significantly different from the frequency of the first signal, said first signal being recorded past the end of the message and the second signal at an intermediate point of the message, a first electronic switching means associated with the master projector and responsive for operation to the first signal, a second electronic switching means associated with the slave projector and responsive for operation to the second signal, first circuit means including said sound head and said first switching means to operate the latter via the sound head upon reception of the first signal, second circuit means including said sound head and said second switching means to operate the latter via the sound upon reception of the second signal, and control circuit means connecting said cycling means and said switching means, operation of the first switching means activating the cycling means for disconnecting the visual message by the master projector and for starting the visual message by the slave projector and operation of the second switching means activating the cycling means for terminating the audible message by the master projector and the slave projector for terminating the visual message by the slave projector.

17. A multiple projector system comprising in combination:
    a sound slide master projector for projecting and playing back respectively a succession of presentation units each including a slide and a tape having recorded thereon an audible message;
    a slave projector for projecting a succession of pictorial messages;
    electrically operated cycling means cotrolling the master projector and the slave projector, said cycling means being programmed:
        (a) first to activate the master projector for playing back and projecting respectively the tape and the slide of a presentation unit;
        (b) then to discontinue projection by the master projector after a first predetermined period of time while continuing playback and to activate substantially simultaneously the slave projector for projection;
        (c) then to discontinue playback by the master projector and projection by the slave projector at the end of a second predetermined period of time;
        (d) then to advance the master projector for projection and playback of another presentation unit and the slave projector for projection of another pictorial message; and
    electronic control means for controlling said cycling means, said control means including a tape having recorded thereon in addition to the message a first frequency tone signal and a second frequency tone signal of a frequency significantly different from the frequency of the first signal, said first signal being recorded past the end of the message and the second signal at an intermdeiate point of the message, the first signal representing the second predetermined period and the second signal the first predetermined period, a first electronic switching means associated with the master projector and responsive for operation to the second signal, first circuit means including said sound head and said first switching means to operate the latter via the sound head upon reception of the first signal, second circuit means including said sound head and said second switching means to operate the latter via the sound head upon reception of the second signal, and control circuit means connecting said cycling means and said switching means, operation of the first switching means activating the cycling means for disconnecting the visual message by the master projector and for starting the visual message by the slave projector and opeation of the second switching means activating the cycling means for terminating the audible message by the master projector and the slave projector for terminating the visual message by the slave projector.

18. A multiple projector system according to claim 17 and comprising a second slave projector for projecting a succession of pictorial messages, said cycling means being further programmed:
    (a) to activate the second slave projector for projection during the playback period of the master projector;
    (b) then to discontinue projection by the second slave projector after a third predetermined period of time;
    (c) then to advance also the second slave projector for projection of the next pictorial message; and
    wherein said electronic control means further comprise a third frequency tone signal different in frequency from the first signal and recorded on the tape at a second intermediate point, third electronic switching means responsive for operation to said third signal, said third switching means being also included in the control circuit means, said control circuit means upon operation of the third switching means activating the cycling means for terminating projection by the first slave projector and starting projection by the second slave projector while continuing playback by the master projector until the end of the second predetermined period of time.

19. The multiple projector system according to claim 18 wherein said electronic control means control said cycling means so that the first slave projector is deactivated for projecting a pictorial message prior to the activation of the second slave projector for projecting a pictorial message.

20. The multiple projector system according to claim 18 wherein said second slave projector is a motion picture type projector.

21. The multiple projector system according to claim 20 and further comprising second control circuit means, said second control circuit means including:

a motion picture film having lengthwise alternating picture frame sections and opaque sections, said film being adapted to be projected by said motion picture projector;

first switch means connectable to said motion picture projector for controlling running and stopping of the same;

light-sensitive second switch means controlled by light received from the motion picture projector and controlling the first switch means to effect running of said projector when a picture frame section is in projection position and to effect stoppage when an opaque section of the film succeeding a picture frame section thereof reaches the projection position thereby cutting off light to the light-sensitive second switch means, said second control circuit means including said light-sensitive second switch means and being connected in circuit with said first control circuit means and said cycling means for control by said third signal, activation of the second control circuit means by the third signal via the first control circuit means operating the cycling mans for terminating projection of pictorial messages by the master projector and the first slave projector and starting the second slave projector (motion picture projector) for projection of pictorial messages, reception of the first signal by the second control circuit means via the first control circuit means terminating operation of the second slave projector.

22. The multiple projector system according to claim 21 and comprising time-delay switch means controlling the light-sensitive second switch means to stop the second slave projector at the end of the delay time of the delay-switch means and the light from the second slave projector to the light-sensitive second switch means is cut off.

23. The multiple projector system according to claim 21 wherein:

a starting switch means is included in said second control circuit means, closing of said starting switch means energizing said second control circuit means for starting running of the motion picture projector;

time-delay switch means also included in said second control circuit means, the delay time of the delay switch means being started by the light-sensitive switch means when the latter receives light from the motion picture projector, said delay switch means at the end of the delay time opening said second control circuit means; and by-pass circuit means controlled by the light-sensitive switch means to by-pass the opening of the second control circuit means by the delay switch means when and while the light-sensitive switch means receives light, whereby upon initially placing an opaque film section in position for projection by the motion picture projector and operating said starting switch means the motion picture projector starts transport of the film, but the light-sensitive switch means remains inactive until the next succeeding picture frame section reaches the projection position whereupon projection by the motion picture projector starts, activation of the light-sensitive switch means by the light now received from said projector starting the delay by the delay switch means, said delay switch means becoming effective to stop running of the motion picture projector when the next opaque film section reaches the projection position.

24. The multiple projector system according to claim 23 wherein said light-sensitive switch means comprises a photoelectric relay, the state of energization of said relay controlling said by-pass circuit means, and a light-deviating means deflecting light from the motion picture projector to said photo-electric relay for energizing the same, energization of the relay activating the delay switch means.

25. The multiple projector according to claim 24 wherein said light-deviating means is a beamsplitter placed in the light beam projection path of the motion picture projector to deflect part of the light of said beam to the photoelectric relay.

26. The multiple projector system according to claim 25 wherein said time-delay switch means comprises a temperature-sensitive switch means having normally closed switch contacts controlling operation of the motion picture projector, said temperature-sensitive switch means including heating means connected in circuit with the light-sensitive switch means, said heating means being activated by the light-sensitive switch means when light from the motion picture projector impinges upon the same, activation of the heating means causing opening of the switch contacts thereby causing stoppage of the motion picture projector.

References Cited

UNITED STATES PATENTS

| | | | |
|---|---|---|---|
| 2,811,588 | 10/1957 | Julie | 353—15 |
| 3,276,314 | 10/1966 | Robinson | 353—111 |
| 3,408,139 | 10/1968 | Schwartz et al. | 353—15 |

SAMUEL S. MATTHEWS, Primary Examiner